(12) United States Patent
Tamaru

(10) Patent No.: US 7,599,099 B2
(45) Date of Patent: Oct. 6, 2009

(54) IMAGE PROCESSING APPARATUS AND IMAGE PROCESSING METHOD

(75) Inventor: Jun Tamaru, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 606 days.

(21) Appl. No.: 11/419,551

(22) Filed: May 22, 2006

(65) Prior Publication Data

US 2006/0268311 A1 Nov. 30, 2006

(30) Foreign Application Priority Data

May 26, 2005 (JP) ............... 2005-154618
May 27, 2005 (JP) ............... 2005-155700

(51) Int. Cl.
G06K 9/00 (2006.01)
G06K 9/18 (2006.01)
G06K 15/00 (2006.01)
H04N 1/40 (2006.01)

(52) U.S. Cl. ............... 358/3.28; 358/1.14; 358/1.1; 358/1.13; 358/3.24; 382/100; 283/113; 283/72

(58) Field of Classification Search ............ 358/1.2, 358/1.9, 2.1, 3.28, 1.13–1.18, 450; 382/100; 399/366, 79–81; 380/203; 713/176, 193; 283/902, 92, 113
See application file for complete search history.

(56) References Cited

U.S. PATENT DOCUMENTS

| 7,106,884 | B2 | 9/2006 | Tamaru | |
|---|---|---|---|---|
| 7,190,807 | B2 | 3/2007 | Tamaru et al. | |
| 7,209,572 | B2 | 4/2007 | Iwamura et al. | |
| 7,227,661 | B2* | 6/2007 | Matsunoshita | 358/1.15 |
| 2003/0179399 | A1* | 9/2003 | Matsunoshita | 358/1.13 |
| 2004/0051885 | A1* | 3/2004 | Matsunoshita | 358/1.9 |
| 2004/0141631 | A1 | 7/2004 | Iwamura et al. | |
| 2004/0142096 | A1 | 7/2004 | Iwamura et al. | |
| 2007/0127771 | A1 | 6/2007 | Kaneda et al. | |

FOREIGN PATENT DOCUMENTS

| JP | 2000-244730 | 9/2000 |
|---|---|---|
| JP | 2001-197297 | 7/2001 |
| JP | 2002-305646 | 10/2002 |
| JP | 2003-187292 | 7/2003 |
| JP | 2004-112356 | 4/2004 |
| JP | 2004-112357 | 4/2004 |
| JP | 2004-199622 | 7/2004 |
| JP | 2004-336220 | 11/2004 |
| JP | 2005-128163 | 5/2005 |

* cited by examiner

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

A copy-forgery-inhibited pattern image including added digital information is generated by an on-demand output of the pattern by a printer. An image processing apparatus for generating a copy-forgery-inhibited pattern image includes: a pattern storage section for storing a plurality of patterns that constitute a camouflage pattern image and that respectively represent specific bit values; an information input unit for inputting arbitrary information; and a camouflage pattern image structuring unit for receiving the information from the information input unit to represent a bit string of a binary representation of the information as an arrangement of a plurality of patterns. The image processing apparatus further includes a random number generation unit for generating a random number sequence; and a selection output unit for receiving the random number sequence from the unit and the information outputted from the information input unit to output, based on predetermined information, any one of them.

9 Claims, 19 Drawing Sheets

FIG.10

LOW-PASS FILTER

BINARIZATION

INVERSION

IMAGE PROCESSING APPARATUS AND IMAGE PROCESSING METHOD

BACKGROUND OF THE INVENTION

1. Field of the Invention

The present invention relates to an image processing apparatus and an image processing method that synthesize, for the purpose of preventing illegal forgery and information leakage by the copy of an important document, a copy-forgery-inhibited pattern image on a document to output the document.

2. Description of the Related Art

There may be a case in which a document such as a receipt, security, or certificate is printed so that, in order to prevent the document from being copied easily, a special pattern such as characters or an image is printed on the background. The entirety of this special pattern is generally called as a copy-forgery-inhibited pattern image including a latent image part and a background part. This is a pattern having a mechanism through which an original is prevented from being easily copied. An original having this pattern realizes an effect to psychologically prevent an attempt for forging an original by copying the original.

A copy-forgery-inhibited pattern image in an original consists of a region in which dots remains after the original is copied and a region in which dots disappear after the original is copied. These regions have the same density. These two regions have substantially the same average density. When these regions are seen by the unassisted eye in a macroscopic manner, it cannot be recognized that these regions include characters or an image (e.g., "copy"). However, the respective two regions have different characteristics when being seen by the unassisted eye in a microscopic manner. In the present invention, these hidden characters or image are differentiated from the background by being called as a latent image.

For example, a region in which dots remain after an original is copied (which will be called as a latent image part) is composed of concentrated dots while a region in which dots disappear after an original is copied (which will be called as a background part) is composed of dispersed dots. As a result, two regions that have substantially the same density and that have different characteristics as described above can be prepared.

Concentrated dots and dispersed dots can be generated, from an image processing viewpoint, by a halftone dot processing using halftone dots having different Lines Per Inch (LPI) or a dither processing using a dither matrix having a different characteristic.

In the halftone dot processing, halftone dots having a low LPI may be used in order to obtain an arrangement of concentrated dots and halftone dots having a high LPI may be used in order to obtain an arrangement of dispersed dots.

In the dither processing using a dither matrix, a dot concentrated-type dither matrix may be used in order to obtain an arrangement of concentrated dots and a dot dispersed-type dither matrix may be used to obtain an arrangement of dispersed dots.

Thus, when the halftone dot processing is used to generate a copy-forgery-inhibited pattern image, a latent image part is appropriately formed by the halftone dot processing having a low LPI while a background part is appropriately formed by the halftone dot processing having a high LPI. When the dither processing is used to generate a copy-forgery-inhibited pattern image, a latent image part is appropriately formed by the dither processing using the dot concentrated-type dither matrix while a background part is appropriately formed by the dither processing using the dot dispersed-type dither matrix.

Generally, a copying machine has limitation in the image reproduction capability that depends on an input resolution for reading the minute dots of a to-be-copied item and an output resolution for reproducing minute dots. Thus, when a to-be-copied item includes isolated and minute dots that exceed the limit of the image reproduction capability of the copying machine, the minute dots cannot be perfectly reproduced in a copy, thus failing to reproducing a part of the isolated and minute dots.

Due to this reason, when a copy-forgery-inhibited pattern image includes a background part that is provided to exceed the reproduction limit of a copying machine, large dots (concentrated dots) in the copy-forgery-inhibited pattern image can be reproduced. However, small dots (dispersed dots) cannot be reproduced, thus causing a hidden image (latent image) to appear. Although the dispersed dots in the printed copy are not entirely disappear, the dispersed dots have a density that is clearly different from that of the concentrated dots. In this manner, the hidden image (latent image) can be visually recognized by the human eye.

With regard to the copy-forgery-inhibited pattern image, a technique called as "camouflage" is also well-known that makes it difficult to determine a hidden character or image (latent image).

The camouflage technique provides or adds, in or to the entire copy-forgery-inhibited pattern image including a latent image part and a background part, another pattern section that has a different density from those of the latent image part and the background part and that has a more minute pattern than that of the latent image part. When this camouflage pattern image is seen from a macroscopic viewpoint, the comparison between the camouflage section and the latent image part or the background part is stronger than the comparison between the latent image part and the background part. This provides an effect in which the camouflage pattern image is conspicuous to further obscure the outline of the latent image or the latent image.

When a copy-forgery-inhibited patern image including the camouflage pattern image is compared to a copy-forgery-inhibited pattern image having no camouflage pattern image, the copy-forgery-inhibited pattern image including the camouflage pattern image provides an decoration effect to a printed material.

In order to allow the latent image after a copy operation to be easily determined, dots in the camouflage pattern image after a copy operation are preferably disappear as many as possible. In the case of the simplest implementation, the camouflage can be realized by not printing dots in a part corresponding to a camouflage pattern image part. When a part surrounding the no-dot-print part is composed of a latent image part and a background part, this part is of course printed with different dots corresponding to the respective parts.

As described above, the copy-forgery-inhibited pattern image has been briefly described.

Conventional copy prevention has been performed by using copy prevention papers sold by printing paper manufacturers. The copy prevention papers have been manufactured by previously printing, on an exclusive paper, a copy-forgery-inhibited pattern image including characters or an image (latent image (e.g., "copy"). These copy prevention papers have been purchased by public offices and companies in order to print a document for which the originality is desired to be guaranteed on a copy prevention paper so that the printed material of this document can be prevented from being copied.

However, the conventional copy prevention paper is prepared by the printing paper manufacturer by preprinting a copy-forgery-inhibited pattern image on an exclusive paper. This has caused a disadvantage such as the cost for the exclusive paper and the cost for preparing preprint papers in an amount larger than needed.

However, a new technique has been recently realized by which an copy-forgery-inhibited pattern image is prepared by software to output, by a laser printer, such a document that includes the copy-forgery-inhibited pattern image in the background (this technique will be called herein as an on-demand copy-forgery-inhibited pattern image output method by a printer). Such an apparatus is disclosed, for example, in Japanese Patent Application Laid-open No. 2001-197297.

The on-demand copy-forgery-inhibited pattern image output method by a printer can print a plain paper so as to include a copy-forgery-inhibited pattern image in the background. Thus, this method can print the copy-forgery-inhibited pattern image in the background when required and in a required amount. This eliminates the conventional need to prepare more-than-required copy prevention papers. Therefore, the on-demand copy-forgery-inhibited pattern image output method by a printer can significantly reduce the cost for papers when compared with the conventional copy prevention method using the copy prevention papers.

Furthermore, the conventional copy prevention papers could be available only as the ready-made ones including hidden characters or image (latent image) and the custom-made ones including hidden characters or image (latent image) prepared for a specific user.

When an original including a copy-forgery-inhibited pattern image is copied, a pattern appears in the copied paper, thereby providing a clear differentiation between the original and the copied matter. At the same time, only the copied matter including the pattern also can tell that the copied matter is a copy. Thus, the copied matter can be prevented from being accepted as the original. At the same time, the copy-forgery-inhibited patern image also provides an effect for psychologically preventing the copied matter from being used as the original. However, an copy-forgery-inhibited pattern image is generated as a dot pattern that is synthesized over the entirety of an image of the contents. This has caused a disadvantage that it is impossible to secure a region for representing information for the outputted matter (e.g., information for determining information for an output device or a person performed the output) or digital information (e.g., information for an electronic signature).

Although the above-described information can be added in the outputted matter by partially synthesizing a two-dimensional bar code or the like into the contents image, this requires the copy-forgery-inhibited pattern image to be controlled in order to prevent the copy-forgery-inhibited pattern image from being superposed with the two-dimensional bar code. Thus, a processing for generating the copy-forgery-inhibited pattern image and a synthesizing processing are very complicated. Furthermore, when a printed matter partially includes a region having no copy-forgery-inhibited pattern image, the appearance is deteriorated.

SUMMARY OF THE INVENTION

In view of the disadvantages as described above, it is an objective of the present invention to provide an apparatus and a method for generating a copy-forgery-inhibited pattern image that includes a function as a copy-forgery-inhibited pattern image and that includes therein added digital information.

In order to achieve the objective as described above, an image processing apparatus according to the present invention is characterized in including: a means for generating a copy-forgery-inhibited pattern image including a camouflage pattern image by placing a plurality of types of camouflage pattern images showing different pieces of information on a specific region based on information to be added; and a means for outputting the copy-forgery-inhibited pattern image including a camouflage pattern image generated by the generation means.

In order to achieve the above objective, an image processing method according to the present invention is characterized in including: a step for generating a copy-forgery-inhibited pattern image including a camouflage pattern image by placing a plurality of types of camouflage pattern images showing different pieces of information on a specific region based on to-be-added information; and a step for outputting the copy-forgery-inhibited pattern image including a camouflage pattern image generated by the generation step.

In order to achieve the above objective, a program to be executed by a computer according to the present invention is characterized in including: a step for generating a copy-forgery-inhibited pattern image including a camouflage pattern image by placing a plurality of types of camouflage pattern images showing different pieces of information on a specific region based on to-be-added information; and a step for outputting the copy-forgery-inhibited pattern image including a camouflage pattern image generated by the generation step.

In order to achieve the above objective, a computer-readable recording medium according to the present invention is characterized in recording a program for causing a computer to execute: a step for generating a copy-forgery-inhibited pattern image including a camouflage pattern image by placing a plurality of types of camouflage pattern images showing different pieces of information on a specific region based on to-be-added information; and a step for outputting the copy-forgery-inhibited pattern image including a camouflage pattern image generated by the generation step.

According to the present invention, arbitrary information can be represented by a camouflage pattern image constituting a copy-forgery-inhibited pattern image. Thus, information for an output operation or an output for example can be generated as a copy-forgery-inhibited pattern image that is prevented from having a deteriorated appearance. Furthermore, by using such a camouflage pattern image in a region to be reproduced in a copy, arbitrary information also can be obtained from a copy, thus providing tracking based on the copy.

The above and other objects, effects, features and advantages of the present invention will become more apparent from the following description of embodiments thereof taken in conjunction with theccompanying drawings.

BRIEF DESCRIPTION OF THE DRAWINGS

FIG. 10 is a diagram illustrating an example of key information of an embodiment to which the present invention can be applied;

DESCRIPTION OF THE PREFERRED EMBODIMENTS

Figure 1:
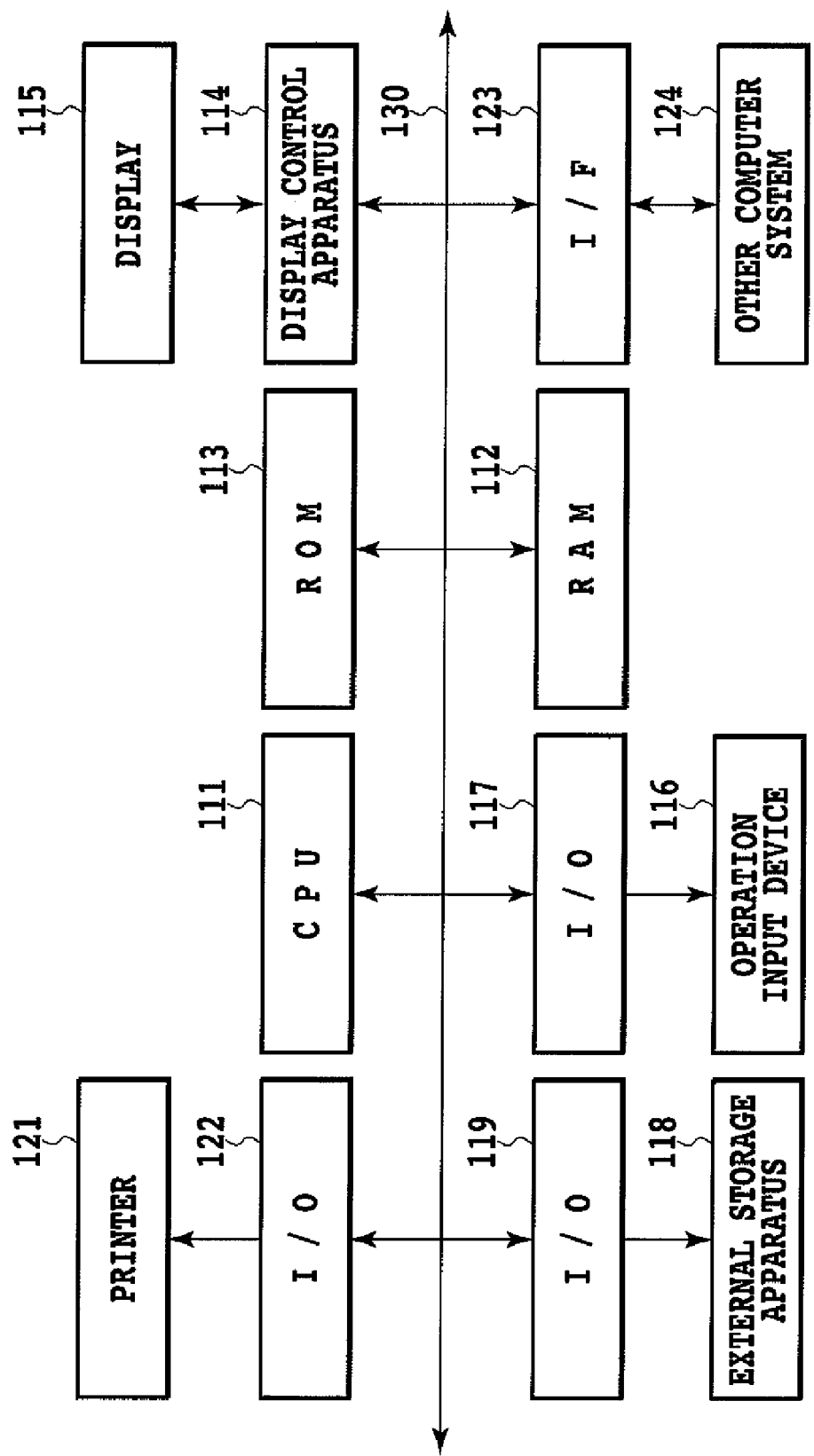
FIG. 1 is a diagram illustrating an example of an outline of an on-demand copy-forgery-inhibited pattern image printing system of an embodiment to which the present invention can be applied.

Hereinafter, an embodiment to which the present invention can be applied will be described in detail with reference to the drawings. In the respective drawings referred herein, components having the same function will be denoted with the same reference numeral.

This embodiment relates to the representation of digital information using a camouflage in a copy-forgery-inhibited pattern image. The present invention is mainly advantageous in that the above camouflaged copy-forgery-inhibited pattern image can provide, in addition to the primary function of a copy-forgery-inhibited patern image for psychologically preventing an illegal copy, another security-related function for providing data for detecting falsification or an electronic signature for example.

Embodiment 1

(Outline of On-demand Copy-forgery-inhibited Pattern Image Printing System)

First, an outline of an on-demand copy-forgery-inhibited pattern image printing system will be described with reference to FIG. 1. FIG. 1 illustrates an outline of a computer system through which the on-demand copy-forgery-inhibited pattern image printing system of this embodiment can be realized.

The on-demand copy-forgery-inhibited pattern image printing system is a system that realizes the on-demand copy-forgery-inhibited pattern image output method by a printer described in the "BACKGROUND OF THE INVENTION" section. This system can be realized by the general system composed of a PC (personal computer), a display, and a printer as shown in FIG. 1.

The following section will describe the functions of the respective components shown in FIG. 1 for realizing the on-demand copy-forgery-inhibited pattern image printing system.

In FIG. 1, the reference numeral 111 denotes a CPU (central processing unit). The CPU uses a program and data stored in a RAM (random access memory) shown by the reference numeral 112 and a ROM (read-only memory) shown by the reference numeral 113. The CPU 111 controls the entirety of the computer and performs various processings (which will be described later).

The RAM 112 includes an area for temporarily storing a program and data loaded from an external storage apparatus 118 and a program and data downloaded from another computer system 124 via an I/F (interface) 123. The RAM 112 also includes an area required for the CPU 111 to perform various processings.

The ROM 113 stores therein a function program and setting data or the like of the computer. The reference numeral 114 denotes a display control apparatus that controls an image and characters or the like to be displayed on a display 115. The display 115 displays an image and characters for example. The display may be a CRT (cathode ray tube) or a liquid crystal screen for example.

The reference numeral 116 denotes an operation input device that is composed of devices through which various instructions can be inputted to the CPU 111 (e.g., keyboard, mouse). When various pieces of information are inputted manually, these pieces of information can be inputted via this operation input device 116. The reference numeral 117 denotes an (input/output) through which various instructions or the like inputted via the operation input device 116 are notified to the CPU 111.

The reference numeral 118 denotes an external storage apparatus that functions as a high-capacity information storage apparatus (e.g., hard disk). The external storage apparatus 118 stores therein: programs for causing the CPU 111 to execute an OS (operating system) and various processings (e.g., copy-forgery-inhibited pattern image generation program); various pieces of information; generated copy-forgery-inhibited pattern images; and inputted images of originals for example. Information is written to the external storage apparatus 118 or is read from the external storage apparatus 118 via the I/O 119.

The reference numeral 121 denotes a printer for outputting a document and an image. Data outputted from the printer 121 is sent via the I/O 122 and using various transmission routes (e.g., the RAM 112, an exclusive communication line from external storage apparatus 118, a network such as LAN (local area network), wireless system). The printer for outputting documents and images include, for example, an ink jet printer, a laser beam printer, a thermal transfer-type printer, and a dot impact printer.

The reference numeral 130 denotes a bus for connecting the CPU 111, the ROM 113, the RAM 112, the I/O 122, the I/O 119, the display control apparatus 114, the I/F 123, and the I/O 117.

In this embodiment, a processing by a copy-forgery-inhibited pattern image generation apparatus (which will be described later with reference to FIG. 2) except for those by the printing section is performed by the computer (which includes at least the sections connected to the bus 130). However, this processing also may be performed by an exclusive hardware circuit in the printer so that the processing to be performed by the computer can be performed by the printer.

Any of the above embodiments is a mere specific example for carrying out the present invention. Thus, these embodiments should not be interpreted as limiting the technical scope of the present invention. Specifically, the present invention can be carried out in various forms without deviating form the technical concept and the main features thereof.

As described above, the outline of the on-demand printing system has been has been described.

(Description of the Details of the Generation of a Copy-forgery-inhibited Pattern Image)

Next, a processing for generating a copy-forgery-inhibited pattern image will be described in detail. In Embodiment 1, an image corresponding to a background part of a copy-forgery-inhibited pattern image is designed so that discrete dots are arranged by a dot dispersed-type dither matrix. An image corresponding to a latent image part to be reproduced on a copy is designed so that concentrated dots are arranged by a dot concentrated-type dither matrix.

Hereinafter, a dither matrix used for generating an image of a background part will be called as a background dither matrix while a dither matrix used for generating an image of a latent image part will be called as a latent image dither matrix.

The dither method is a method by which an input image signal having multiple values is compared to a threshold value calculated based on a fixed rule so that the resultant magnitude correlation is used to output a binary image. A dither matrix is a threshold value matrix in which threshold values are arranged in a two-dimensional manner. The threshold values are used when the dither method is used to binarize an input image signal.

By subjecting a pixel value of an input image signal to a binarization processing by a threshold value of a corresponding dither matrix, a binary image (threshold value pattern) is obtained. With regards to the obtained binary image here, when the tone of an input image signal is smaller than the threshold value of the dither matrix, the pixel value is allocated with one bit (e.g., 1) and, when the tone of an input image signal is equal to or higher than the threshold value of the dither matrix, the pixel value is allocated with the other bit (e.g., 0).

In Embodiment 1, a binary image constituting a background and a binary image constituting a latent image part are provided so that the background part and the latent image part printed on a paper by a printer have substantially the same color density when seen by the human eye. Thus, these respective binary images are previously generated by inputting appropriate input image signals by the dither method.

In the following description, a binary image constituting a background will be called as a background threshold value pattern while a binary image constituting a latent image part will be called as a latent image threshold value pattern.

Figure 2:
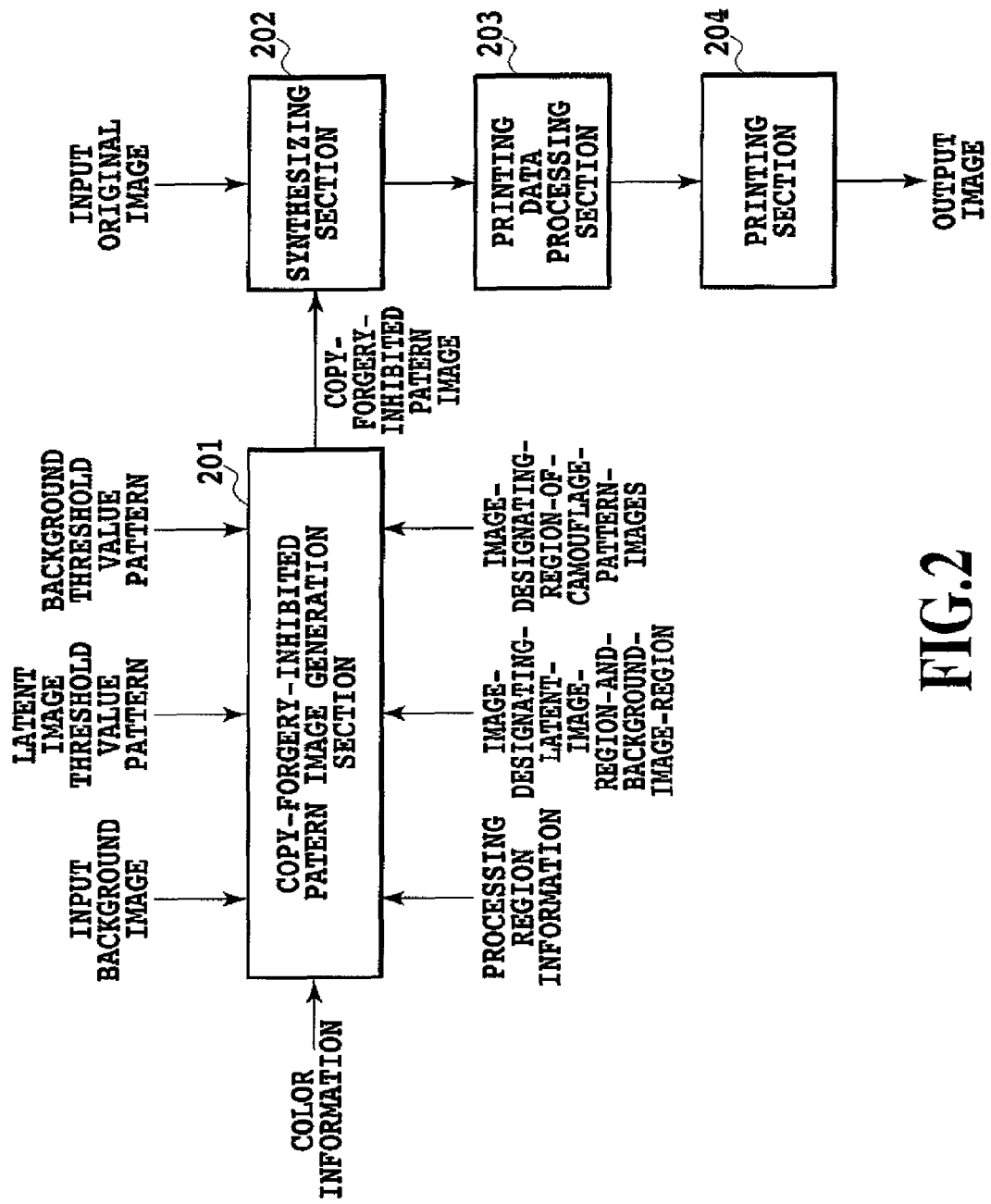
FIG. 2 is a block diagram illustrating the configuration of an internal processing for generating a copy-forgery-inhibited pattern image of an embodiment to which the present invention can be applied.

FIG. 2 is a block diagram illustrating the configuration of an internal processing of copy-forgery-inhibited pattern image generation in Embodiment 1. The copy-forgery-inhibited pattern image generation apparatus of Embodiment 1 is composed of: a copy-forgery-inhibited pattern image generation section 201; a synthesizing section 202; a printing data processing section 203; and a printing section 204. The following section will be described on the assumption that the printing section 204 is included in the printer 121 in FIG. 1.

First, the copy-forgery-inhibited pattern image generation section 201 is inputted with an input background image, color information, processing region information, a latent image threshold value pattern, a background threshold value pattern, an image-designating-latent-image-region-and-background-image-region, and an image-designating-region-of-camouflage-pattern-images, thereby generating and outputting a copy-forgery-inhibited pattern image.

Based on a predetermined rule, the copy-forgery-inhibited pattern image generation section 201 subjects the input background image to an image processing, thereby outputting a copy-forgery-inhibited pattern image. The input background image is an image corresponding to the size of a generated copy-forgery-inhibited pattern image and may be a multiple value image or a binary image. The processing region information represents a region in an input image information in which a pattern is added. This processing region information is represented by a coordinate value or the like and is determined in accordance with a coordinate value previously determined based on the size of an output paper or a region to which a copy-forgery-inhibited pattern image is applied that is set by a user interface or the like.

An image-designating-latent-image-region-and-background-image-region is a base image for specifying a latent image part and a background part and is structured so that one pixel is made by one bit. One bit value (e.g., 1) of the image-designating-latent-image-region-and-background-image-region represents a latent image part while the other bit value (e.g., 0) represents a background part.

Figure 3:
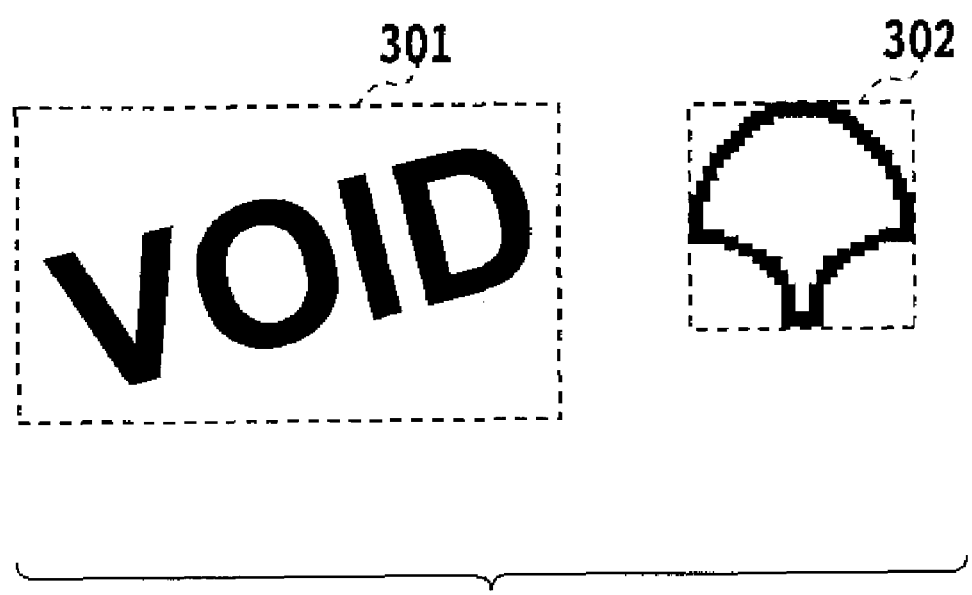
FIG. 3 is a diagram illustrating examples of an image-designating-latent-image-region-and-background-image-region and an image-designating-region-of-camouflage-pattern-images of an embodiment to which the present invention can be applied.

FIG. 3 shows examples of an image-designating-latent-image-region-and-background-image-region and an image-designating-region-of-camouflage-pattern-images. In FIG.

3, the reference numeral 301 denotes an example of an image-designating-latent-image-region-and-background-image-region and the reference numeral 302 denotes an example of an image-designating-region-of-camouflage-pattern-images. In an image-designating-latent-image-region-and-background-image-region and an image-designating-region-of-camouflage-pattern-images, the images shown in FIG. 3 may be arranged to correspond to the size of a printing region in a tile arrangement.

The image-designating-region-of-camouflage-pattern-images is an image for specifying, for the purpose of providing a camouflage effect, a region having a reduced density. The image-designating-region-of-camouflage-pattern-images is also structured so that one pixel is made by one bit. One bit value (e.g., 1) of the image-designating-region-of-camouflage-pattern-images represents that the region is not a camouflage region having a reduced density while the other bit value (e.g., 0) of the image-designating-region-of-camouflage-pattern-images represents that the region is a camouflage region having a reduced density.

The copy-forgery-inhibited pattern image generated by the copy-forgery-inhibited pattern image generation section 201 is outputted to the synthesizing section 202. A method for generating a copy-forgery-inhibited pattern image will be described in detail later with reference to FIG. 4.

The synthesizing section 202 synthesizes the input image of an original with the copy-forgery-inhibited pattern image generated by the copy-forgery-inhibited pattern image generation section 201 to generate a synthesized-image-including-copy-forgery-inhibited-pattern-image. It is noted that, when a copy-forgery-inhibited pattern imag is directly used as a synthesized-image-including-copy-forgery-inhibited-pattern-image regardless of the contents of an input image of an original, the synthesizing section does not need to refer to the input image of an original.

A synthesized-image-including-copy-forgery-inhibited-pattern-image also may be generated by subjecting the respective objects constituting a copy-forgery-inhibited pattern imag and an input image of an original to a color matching processing to subsequently synthesize the object constituting the input image of an original with the copy-forgery-inhibited pattern image. Alternatively, the synthesized-image-including-copy-forgery-inhibited-pattern-image also may be subjected to a color matching processing by the subsequent printing data processing section 203.

The printing data processing section 203 receives, as drawing information, the synthesized-image-including-copy-forgery-inhibited-pattern-image that was synthesized by the synthesizing section 202 via a drawing interface of an OS (Operating System) and sequentially converts the information to a printing command. The drawing interface may be, for example, Graphic Device Interface (GDI) of Windows® series as an OS of Microsoft Corporation or QuickDraw of Mac OS series as an OS of Apple Computer Inc, which are well-known. In this conversion, image processings (e.g., a color matching processing, a conversion from RGB (red-green-blue) to CMYK (Cyan Magenta Yellow Black), half-tone processing) is performed as required. Then, the printing data processing section 203 sends, to the subsequent printing section 204, data of the synthesized-image-including-copy-forgery-inhibited-pattern-image having a format that can be interpreted by the printing section 204. The data format may be, for example, the one described by a page description language and the one developed in a printing bit map.

The printing section 204 prints out the data of the synthesized-image-including-copy-forgery-inhibited-pattern-image based on inputted information of the data of the synthesized-image-including-copy-forgery-inhibited-pattern-image.

When this printing is performed by a laser beam printer for example, the printing section 204 is composed of a printer controller and a printer engine. The printer controller is composed of a printing information control section, a page memory, and an output control section for example. The printing information control section analyzes the page description language (PDL) sent from the printing data processing section 203 to develop, in response to drawing and printing commands, a corresponding pattern in the page memory.

In this process, an image processing (e.g., the RGB-CMYK conversion, the half tone processing) is also performed as required. It is noted that, when the data of the synthesized-image-including-copy-forgery-inhibited-pattern-image is determined that the entirety or a part thereof is a printing bit map, the image data is directly developed to the page memory.

The output control section converts the contents of the page memory to a video signal to output the result to the printer engine. The printer engine is composed, for example, of a recording medium transport mechanism, a semiconductor laser unit, a photoconductor drum, a development unit, a fixing unit, a drum cleaning unit, and a separation unit and performs a printing operation based on a known electrophotography process.

Here, there may be a case where the copy-forgery-inhibited pattern image generation section 201 generates a copy-forgery-inhibited pattern image so that the copy-forgery-inhibited pattern image is printed in which each pixel is composed of only primary colors (e.g., cyan, yellow, magenta, black) of the printer. In this case, it is not desirable that the respective pixels represented so as to be outputted by the printer primary colors are printed as pixels of a synthesized color of inks or toners of a plurality of different colors.

Thus, it is desirable that the printing data processing section 203 and the printing section 204 handle pixel values corresponding to a copy-forgery-inhibited pattern image in a synthesized-image-including-copy-forgery-inhibited-pattern-image so that pixel values of one pixel are not simultaneously represented, during the printing, by a plurality of different colors of inks or toners. Pixel values are, for example, those of cyan, magenta, yellow, or black. Specifically, pixel values are desirably set so that they are for mixed colors. Specifically, a setting is preferably introduced according to which even the respective pixels having passed a color conversion processing (e.g., color matching) and having been subjected to the half tone processing are always printed by single inks or toners. However, this does not apply when the data is printed out by an ink jet printer so that one pixel of a copy-forgery-inhibited pattern image is represented by light ink and thick ink or large ink dots and small ink dots of a single color. Alternatively, colors in the copy-forgery-inhibited pattern image also may be varied by a balanced arrangement of cyan pixels and yellow pixels so that the copy-forgery-inhibited pattern image can be seen as green by the human eye. However, even in this case, it is desirable that one pixel of the copy-forgery-inhibited pattern image composed of primary colors of the printer is accurately outputted only by corresponding cyan or yellow toner or ink. Primary colors are cyan, yellow, magenta, and black.

However, an image realizing the effect of the pattern also can be generated without printing one pixel of a copy-forgery-inhibited pattern image by printer primary colors (cyan, yellow, magenta, and black). Even when one pixel of a copyforgery-inhibited pattern image is represented by a plurality of different colors of inks or toners, the image can be used as a copy-forgery-inhibited pattern image if the copied image can remain as a latent image (i.e., if the image can be seen as if it floats from the background).

In Embodiment 1, data of a copy-forgery-inhibited pattern image, an input image of an original, a synthesized-image-including-copy-forgery-inhibited-pattern-image, and a tsynthesized-image-including-copy-forgery-inhibited-pattern-image is digital data and a synthesized-image-including-copy-forgery-inhibited-pattern-image represents an image printed on a paper.

Alternatively, the printing data processing section 203 also may be provided before the synthesizing section 202 in order to perform a processing for converting the data of a copy-forgery-inhibited pattern image and the data of an input image to printing commands, respectively. In this case, the synthesizing section 202 is provided in the printer 121 and the copy-forgery-inhibited pattern image data and the data of the input image of an original are developed into a bit map image before being synthesized.

Figure 4:
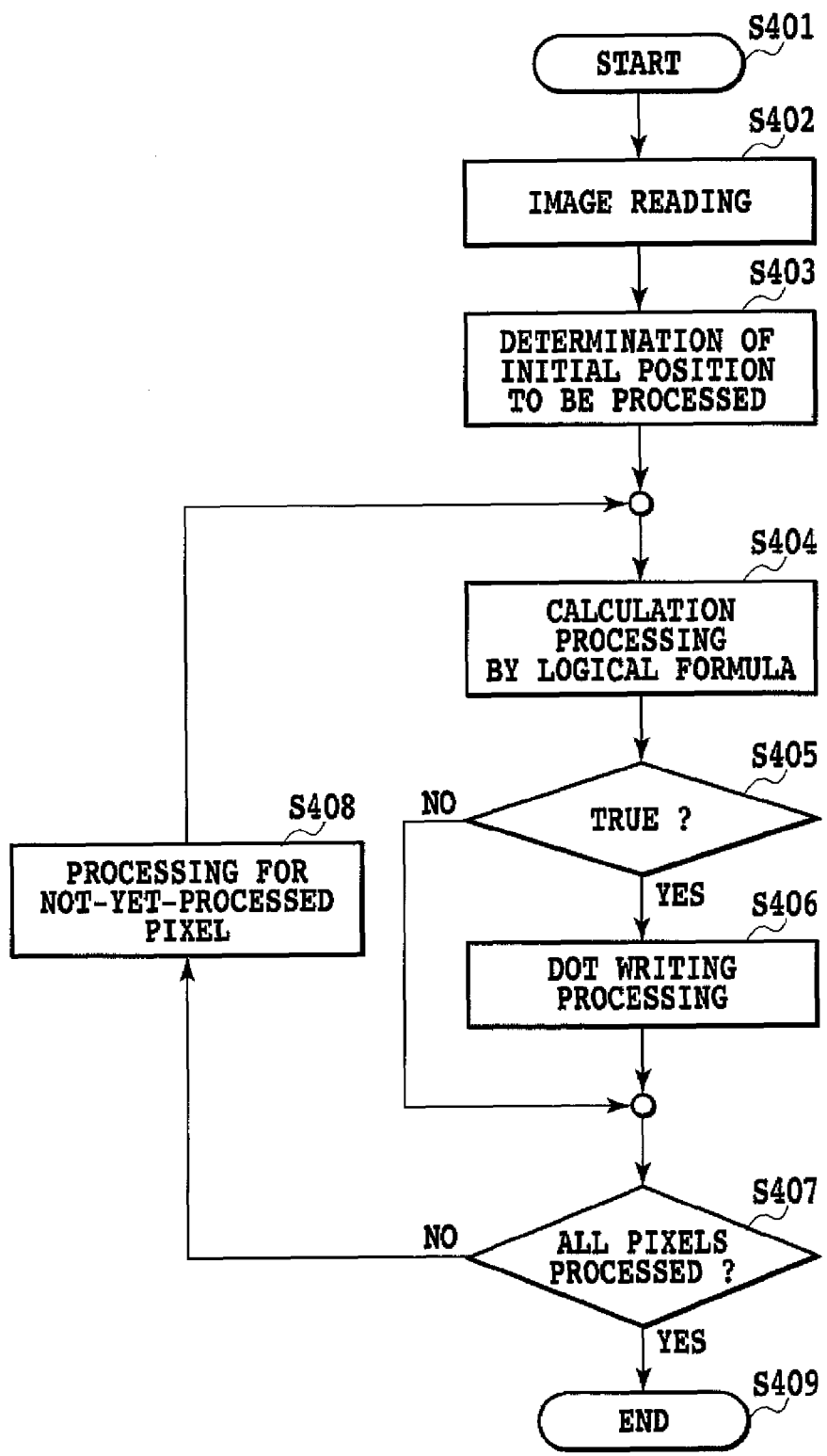
FIG. 4 is a flowchart illustrating a processing for generating a copy-forgery-inhibited pattern image of an embodiment to which the present invention can be applied.

FIG. 4 is a flowchart illustrating an internal processing procedure by the copy-forgery-inhibited pattern image generation section 201 in Embodiment 1. Hereinafter, a processing for generating a copy-forgery-inhibited pattern image will be described with reference to FIG. 4. This processing is performed by allowing the CPU 111 to perform a copy-forgery-inhibited pattern image generation program. However, the present invention is not limited to this configuration.

First, S401 starts a copy-forgery-inhibited pattern image generation processing when a user sends an instruction or the like or when a user starts the program via a user interface.

Next, S402 reads the above-described input background image, background threshold value pattern, latent image threshold value pattern, image-designating-latent-image-region-and-background-image-region, and image-designating-region-of-camouflage-pattern-images.

Next, S403 determines initial pixels for generating a copy-forgery-inhibited pattern image. For example, when such a copy-forgery-inhibited pattern image is generated that is applied to an entire printable surface of a paper to which an input image is outputted, a data size corresponding to this paper size will be a size within which the copy-forgery-inhibited pattern image is generated. When the copy-forgery-inhibited pattern image is generated by an image processing in an order of a raster scanning from the upper-left to the lower-right with regards to this size within which the copy-forgery-inhibited pattern image is to be generated, the upper-left is assumed as an initial position.

Next, S404 superposes, from the upper-left of the input background image, the background threshold value pattern, latent image threshold value pattern, image-designating-latent-image-region-and-background-image-region, and image-designating-region-of-camouflage-pattern-images so that they are in a tile arrangement. Specifically, S404 subjects the pixels of the to be processed input background image to the following formula (1) to determine nWriteDotOn representing whether pixel values corresponding to to-be-printed dots are written or not. These pixel values correspond to the inputted color information.

$$nWriteDotOn = $$
$$nCamouflage \times (nSmallDotOn \times \overline{nHiddenMark} + $$
$$nLargeDotOn \times nHiddenMark)$$

Formula (1)

Definition of elements of Formula 1 will be shown below.

nCamouflage: This is 0 (zero) when a pixel in an image-designating-region-of-camouflage-pattern-images is in a camouflage region and is 1 (one) when the pixel is not in a camouflage region.

nSmallDotOn: This is 1 (one) when a pixel value in a background threshold value pattern represents black and is 0 (zero) when the value represents white.

nLargeDotOn: This is 1 (one) when a pixel value in a latent image threshold value pattern represents black and is 0 (zero) when the value represents white.

nHiddenMark: This is 1 (one) when a pixel in an image-designating-latent-image-region-and-background-image-region corresponds to a latent image part and is 0 (zero) when the pixel corresponds to a background part.

$\overline{nHiddenMark}$: Negation of "nHiddenMark". This is 0 (zero) for a latent image and is 1 (one) for a background part.

It is noted that the respective pixels to be processed need not be always calculated by all elements of Formula (1). Thus, the processing can be performed with a higher speed by omitting unnecessary calculation.

For example, when nHiddenMark=1 is established, then $\overline{nHiddenMark}$=0 is established. When nHiddenMark=0 is established, then $\overline{nHiddenMark}$=1 is established. Thus, when nHiddenMark=1 is established, the value of Formula (2) may be used as the value of nLargeDotOn and, when nHiddenMark=0 is established, the value of Formula (2) may be used as the value of nSmallDotOn.

The value of nCamouflage is a coefficient of the entirety. Thus, when nCamouflage=0 is established, nWriteDotOn=0 is established. Thus, when nCamouflage=0 is established, a part after of nCamouflage of $$(nSmallDotOn \times \overline{nHiddenMark} + nLargeDotOn \times nHiddenMark)$$

Formula (2)

may be omitted.

A generated copy-forgery-inhibited pattern image is composed by the repetition of a minimum unit of an image that is a least common multiple of the longitudinal and lateral lengths of a background threshold value pattern, a latent image threshold value pattern, an image-designating-latent-image-region-and-background-image-region, and an image-designating-region-of-camouflage-pattern-images. Thus, the copy-forgery-inhibited pattern image generation section 201 generates only a part of a copy-forgery-inhibited pattern image composed by the repetition of the minimum unit and the part of the copy-forgery-inhibited pattern image is repeatedly arranged within a size of the input background image in a tile arrangement. This can reduce the time required for generating the copy-forgery-inhibited pattern image.

Next, S405 determines the calculation result of S404 (value of nWriteDotOn). When nWriteDotOn=1 is established, then the processing proceeds to S406. When nWriteDotOn=0 is established, then the processing proceeds to S407.

S406 performs a processing for writing a pixel value corresponding to dots during the printing.

A pixel value may be changed depending on the color of a copy-forgery-inhibited pattern image. When a black pattern is desired to be prepared, to-be-processed pixels in the input background image are set to correspond to black.

A color copy-forgery-inhibited pattern image also can be prepared by setting to-be-processed pixels in the input background image to correspond to the color of tone or ink of the printer such as cyan, magenta, or yellow.

When an input background image is image data in which one pixel has one to several bit(s), an index color may be used to represent the pixel value. The index color is a method for representing image data by which color information frequently appearing in the target color image is set as an index (e.g., index 0 corresponds to white and index 1 corresponds to cyan). Then, values of the respective pixels are represented by index Nos describing the color information (e.g., the first pixel value is represented by index 1 and the second pixel value is represented by index 2).

S407 determines whether all pixels in a to-be-processed region of the input background image are processed or not. When all pixels in a to-be-processed region of the input background image are not processed, the processing proceeds to S408 to select not-yet-processed pixels and the processings of S404 to S406 are performed again.

When all pixels in a to-be-processed region of the input background image are already processed, the processing proceeds to S409, thereby completing the image processing by the copy-forgery-inhibited pattern image generation section 201.

The processings as described above can generate a copy-forgery-inhibited pattern image obtained by subjecting the input background image to an image processing.

Next, a processing by the synthesizing section 202 for synthesizing the generated copy-forgery-inhibited pattern image with the input image of an original (e.g., form, certificate).

Figure 5:
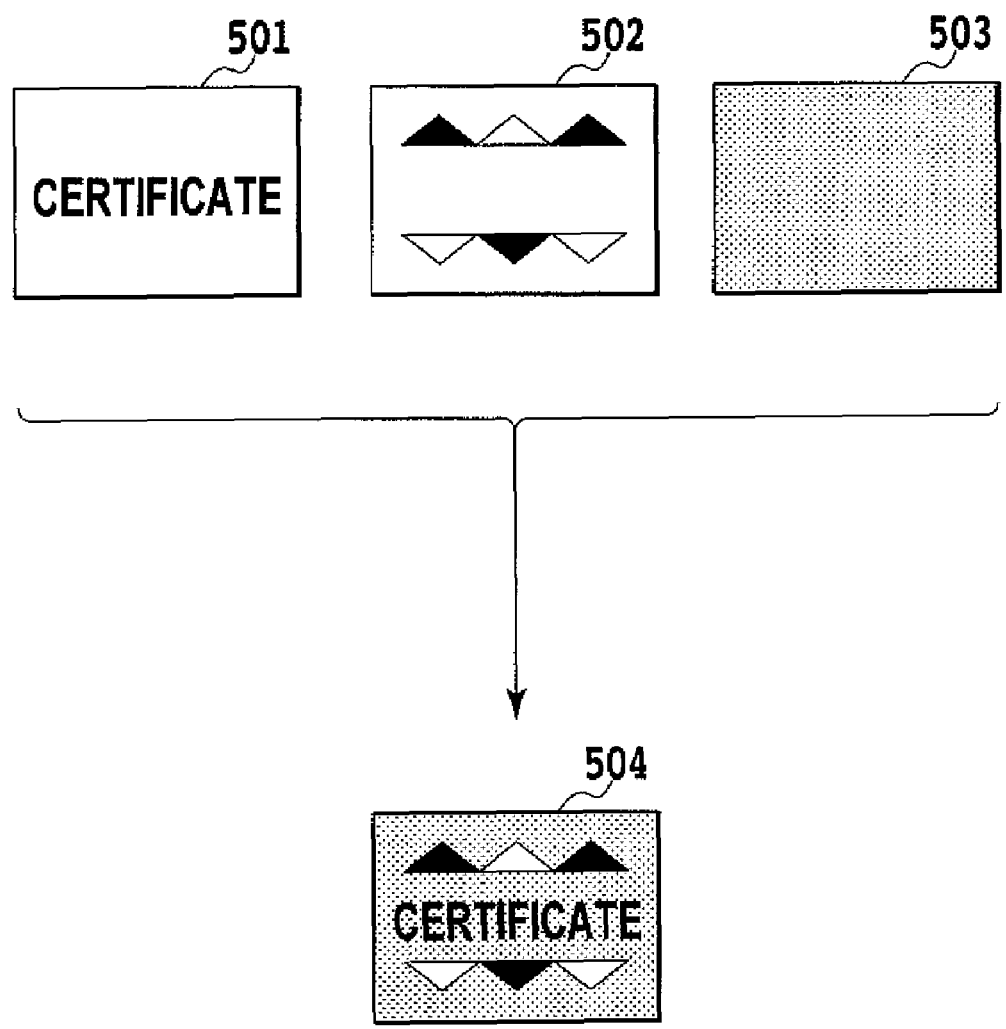
FIG. 5 is a diagram schematically illustrating a processing for synthesizing an image of an inputted original image with a copy-forgery-inhibited pattern image of an embodiment to which the present invention can be applied.

FIG. 5 schematically illustrates the processing for synthesizing an input image of an original with a copy-forgery-inhibited pattern image. In FIG. 5, the reference numeral 501 denotes data of a text attribute; the reference numeral 502 denotes data of a graphic attribute; and the reference numeral 503 denotes a copy-forgery-inhibited pattern image of an image attribute. The text attribute data 501 and the graphic attribute data 502 correspond to the input image of an original. The type and format of the input image of an original are not limited, of course, to these type and format.

The synthesizing section 202 uses a drawing interface of the OS to superpose, by software, the respective images of the reference numerals 501 to 503 in FIG. 5 based on a priority for the arrangement (layer structure). Then, the synthesizing section 202 generates the image 504 obtained by synthesizing the text attribute data, the graphic attribute data, and the copy-forgery-inhibited pattern image of the image attribute. This processing is almost the same as a screen drawing (display drawing) in the drawing software as a general application of a computer. It is noted that, the synthesizing section 202 also may perform a unique processing for synthesizing the image without using the processing by the drawing interface of the OS.

In FIG. 5, the copy-forgery-inhibited pattern image 503 of the image attribute is superposed so that the copy-forgery-inhibited pattern image 503 is in the lowest layer on which the text attribute data 501 and the graphic attribute data 502 are layered.

For example, with regards to a position at which the copy-forgery-inhibited pattern image 503 of an image attribute is superposed with the text attribute data 501, the text attribute data 501 is prioritized over the copy-forgery-inhibited pattern image 503 so that the text attribute data 501 is firstly drawn.

Thus, the copy-forgery-inhibited pattern image is appropriately arranged in the background of the input image of an original and does not deteriorate the visibility of the text attribute data and the graphic attribute data.

In FIG. 5, the copy-forgery-inhibited pattern image 503 is an image having the same size as that of the input image. However, when the copy-forgery-inhibited pattern image is desired to be superposed under only a partial region, then an input background image corresponding to the partial region is inputted by the copy-forgery-inhibited pattern image generation section 201. Thus, only the copy-forgery-inhibited pattern image having the size corresponding to that of the inputted image may be generated and the copy-forgery-inhibited pattern image may be synthesized with the input image of an original by the synthesizing section 202, The synthesized-image-including-copy-forgery-inhibited-pattern-image outputted by the synthesizing section 202 may be data represented by the drawing interface of the OS or may be a bit map image of the synthesization result.

The synthesized-image-including-copy-forgery-inhibited-pattern-image outputted by the synthesizing section 202 is sent to the subsequent printing data processing section 203.

The printing data processing section 203 receives, via the drawing interface of the OS, the synthesized-image-including-copy-forgery-inhibited-pattern-image provided by the synthesizing section 202 and sequentially converts the image to printing commands. In this conversion, an image processing (e.g., color matching processing, RGB-CMYK conversion, half-tone processing) is performed as required. Then, the printing data processing section 203 sends, to the subsequent printing section 204, data of the synthesized-image-including-copy-forgery-inhibited-pattern-image having a format that can be interpreted by the printing section 204 (e.g., data format described by the page description language, data format developed to a printing bit map).

Based on the information of the inputted data of the synthesized-image-including-copy-forgery-inhibited-pattern-image, the printing section 204 prints out the synthesized-image-including-copy-forgery-inhibited-pattern-image.

Although the above-described method for synthesizing the copy-forgery-inhibited pattern image has described a processing for synthesizing an input image of an original having a layer structure with a copy-forgery-inhibited pattern image, a processing for synthesizing an input image of an original having no layer structure with a copy-forgery-inhibited pattern image is also possible (Description of Two-dimensional Code Representation by a Plurality of Camouflage Pattern Images)

The following section will describe an image-designating-region-of-camouflage-pattern-images that can represent digital information (arbitrary information) that is, in other words, a structure in which a camouflage pattern image itself has digital information. In this structure, a camouflage pattern image is composed as a matrix consisting of a plurality of patterns (bit representation patterns). At the same time, individual pattern positions are specified by previously-determined key information as the ones corresponding to arbitrary information (i.e., to-be-added digital information) or the ones corresponding to random values for camouflaging the information.

The information added as a camouflage pattern image also can be set so that this information can be extracted not only from an output of a synthesized original in which a copy-forgery-inhibited pattern image is synthesized with the image of an original but also from a copy obtained by copying this output. Embodiment 1 will describe a structure in which the same added information (arbitrary information) can be extracted from the original and the copy.

Figure 6:
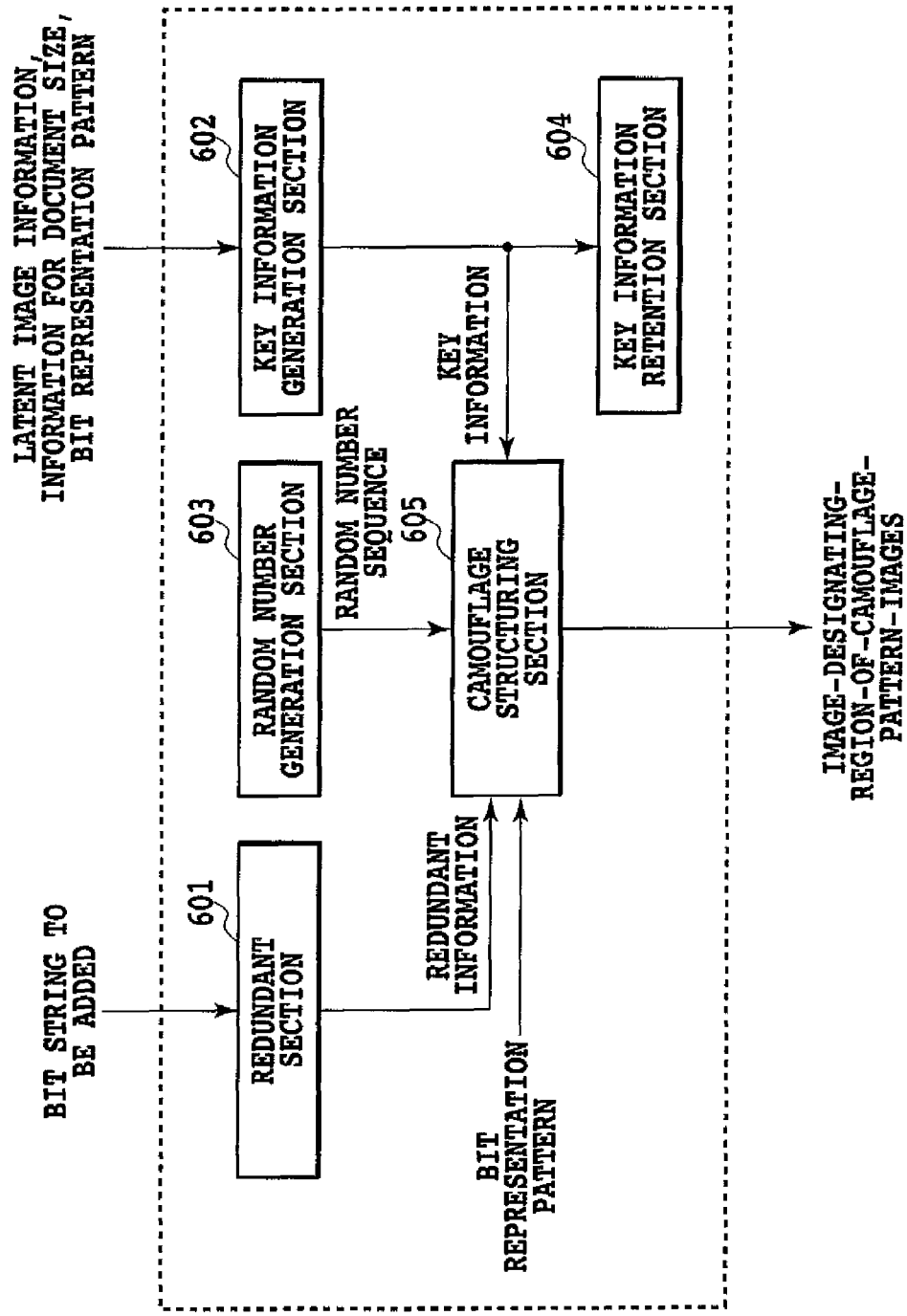
FIG. 6 is a block diagram illustrating the structure of an image-designating-region-of-camouflage-pattern-images-generation section of an embodiment to which the present invention can be applied.

With reference to FIG. 6, a system for representing arbitrary information by a camouflage pattern image will be described. It is noted that this system may be provided as a part of a copy-forgery-inhibited pattern image generation program or may be provided independent from a copy-forgery-inhibited pattern image generation program. Although Embodiment 1 will describe this system as software, this configuration also can be provided by hardware.

This system (functional system) is composed of: a redundant section 601; a key information generation section 602; a random number generation section 603; a key information retention section 604; and a camouflage structuring section 605.

The redundant section 601 is a section that makes to-be-added information (bit string) to be redundant by repetition or error-correcting codes, including the use of known turbo codes.

The random number generation section 603 generates a random number sequence for randomly arranging a plurality of patterns (bit representation patterns) constituting a camouflage pattern image.

The key information generation section 602 is a section that generates the above-described key information based on latent image information, information regarding the size of a document, and a bit representation pattern. In order to provide extraction of information added in an original (output in which the copy-forgery-inhibited pattern image is printed) or the copy, the information is added only in the latent image part and a plurality of patterns (bit representation patterns) are randomly arranged in parts other than the latent image part. To enable this, the key information in this system includes information that specifies a latent image region to be reproduced both in the original and the copy. The generated key information is information that is required for extracting arbitrary information represented as the one substituted with the camouflage pattern image. The latent image information corresponds to a basic image functioning as a copy-forgery-inhibited pattern image (i.e., the above-described image-designating-latent-image-region-and-background-image-region). In Embodiment 1, only a camouflage pattern image part superposed on an image region provided as a latent image part requires information for identifying a latent image part and a background part in order to represent arbitrary information.

Figure 7:
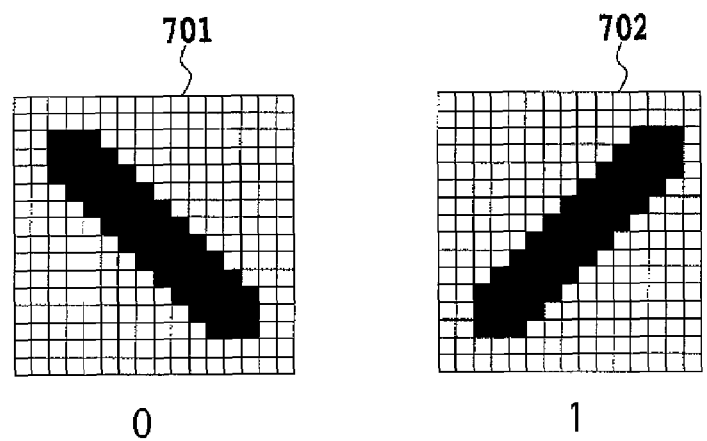
FIG. 7 is a diagram illustrating an example of a bit representation pattern of an embodiment to which the present invention can be applied.

The term "bit representation pattern" means a plurality of patterns constituting a camouflage pattern image. The respective plurality of patterns represents different bit strings or bits. For example, when one bit information is desired to be represented, two bit representation patterns may be allocated with 1 (one) and 0 (zero), respectively. Examples of these two patterns are shown in FIG. 7.

Figure 8:
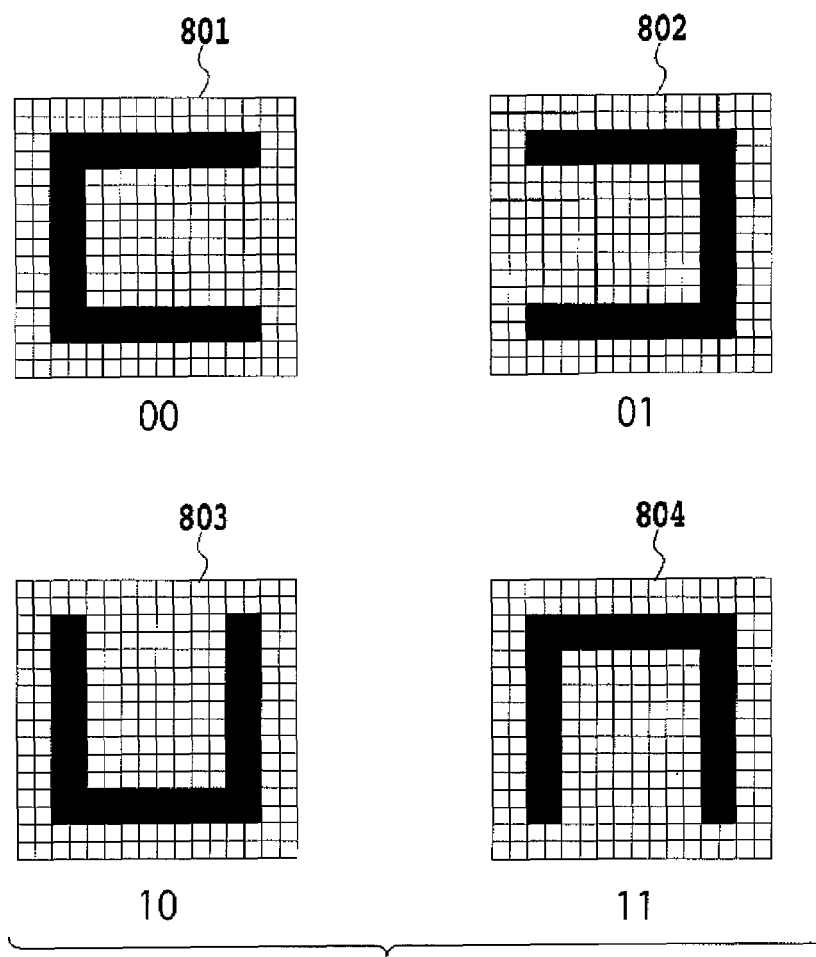
FIG. 8 is a diagram illustrating an example of a bit representation pattern of an embodiment to which the present invention can be applied.
Figure 9:
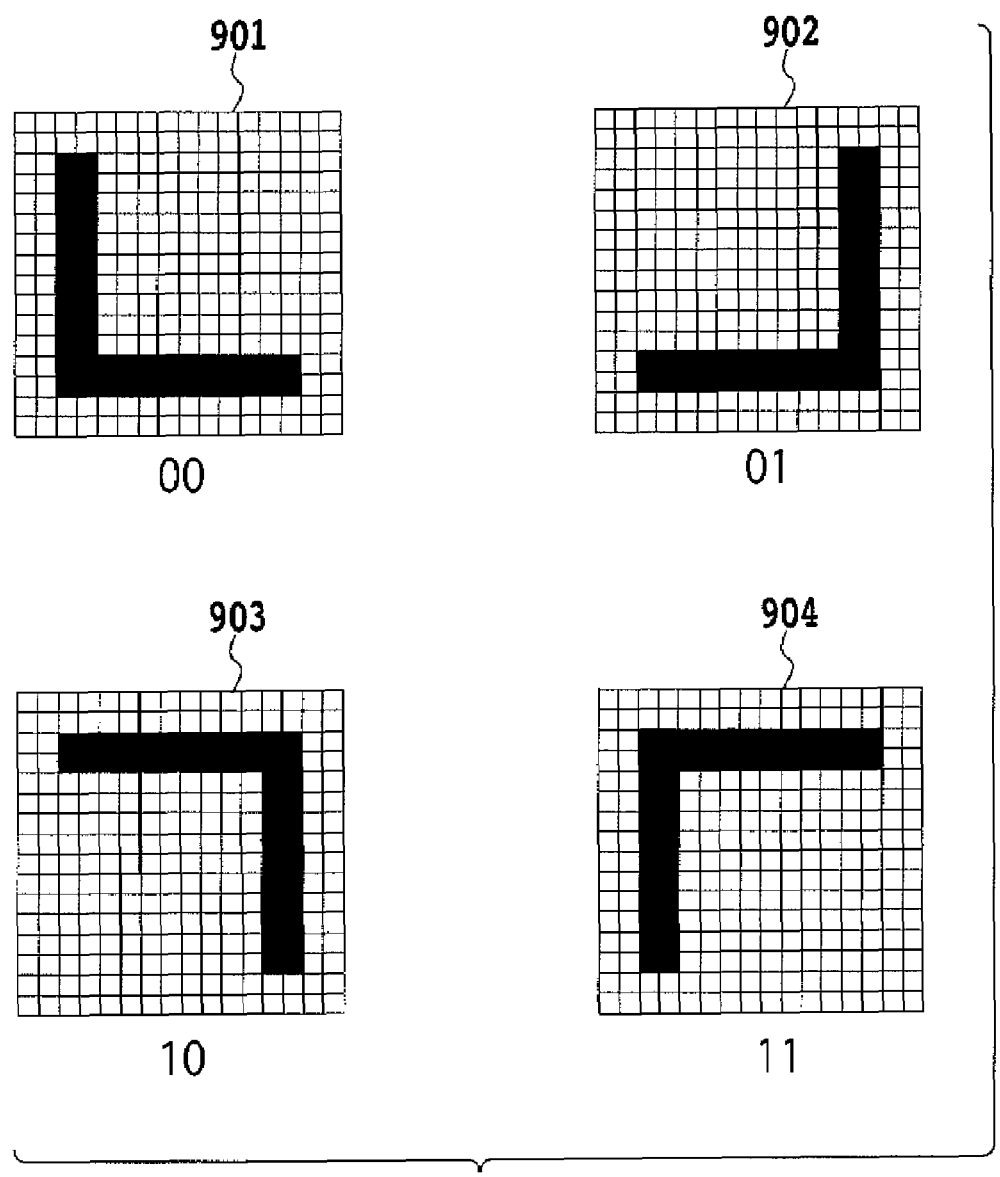
FIG. 9 is a diagram illustrating an example of a bit representation pattern of an embodiment to which the present invention can be applied.

In order to represent 2 bit information (bit string), four bit representation patterns may be appropriately allocated with 00, 01, 10, and 11, respectively. Examples of these four patterns are shown in FIGS. 8 and 9. It is noted that the present invention is not limited to the patterns shown in FIG. 7, FIG. 8, and FIG. 9 and may use any pattern and pattern shape.

The term "key information" generally means a matrix in which elements are 0 (zero) or 1 (one). This matrix has a size determined as shown below.

(Number of rows)=(lateral width of one page of document)÷(lateral width of bit representation pattern)

(Number of columns)=(longitudinal width of one page of document)÷(longitudinal width of bit representation pattern)

Specifically, the key information includes elements in an amount of the bit representation patterns included in the background of the document.

When key information includes an element of 1 (one), the key information generally represents that a corresponding bit representation pattern corresponds to arbitrary information (i.e., to-be-added digital information). When key information includes an element of 0 (zero), the key information generally represents that a corresponding bit representation pattern corresponds to a random value for camouflaging this digital information. In Embodiment 1, whether an element is 0 (zero) or 1 (one) is determined based on whether a latent image part appearing in a copy after a copying operation includes all of specific bit representation patterns or not. When key information includes an element of 1 (one), it represents that all of specific bit representation patterns are included in the latent image part. When key information includes an element of 0 (zero), it represents that all of specific bit representation patterns are not included in the latent image part.

Figure 10:
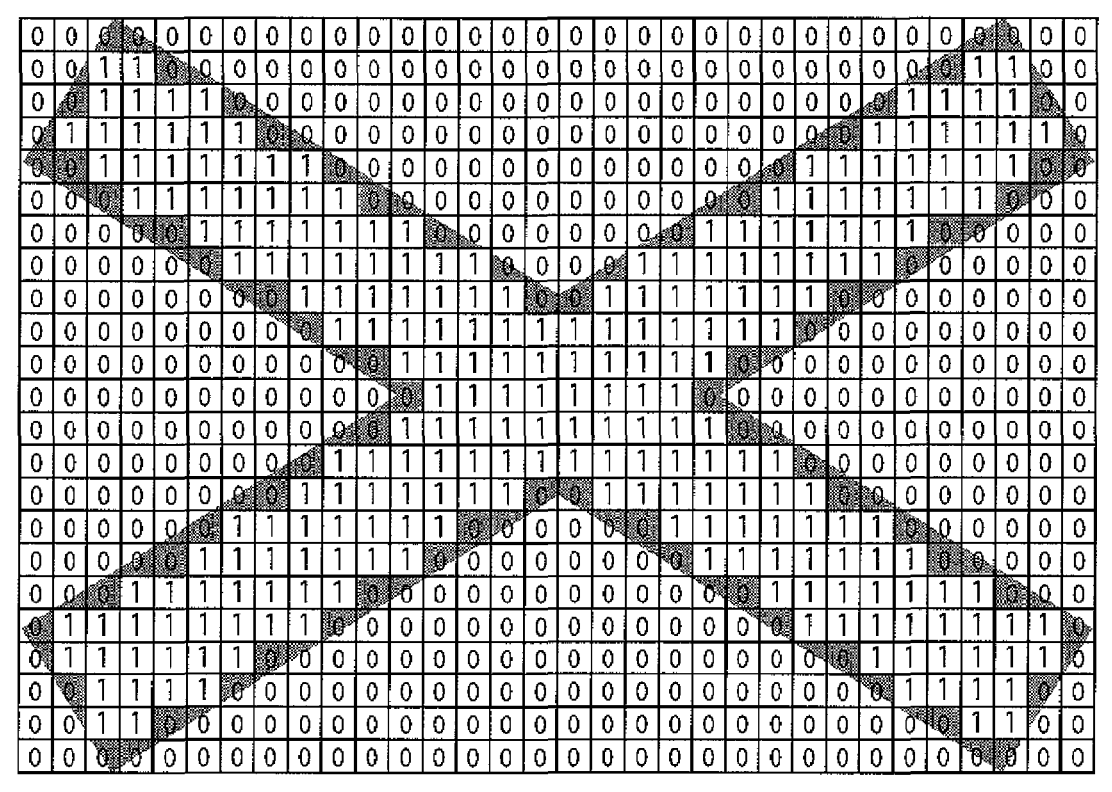
Figure 11:
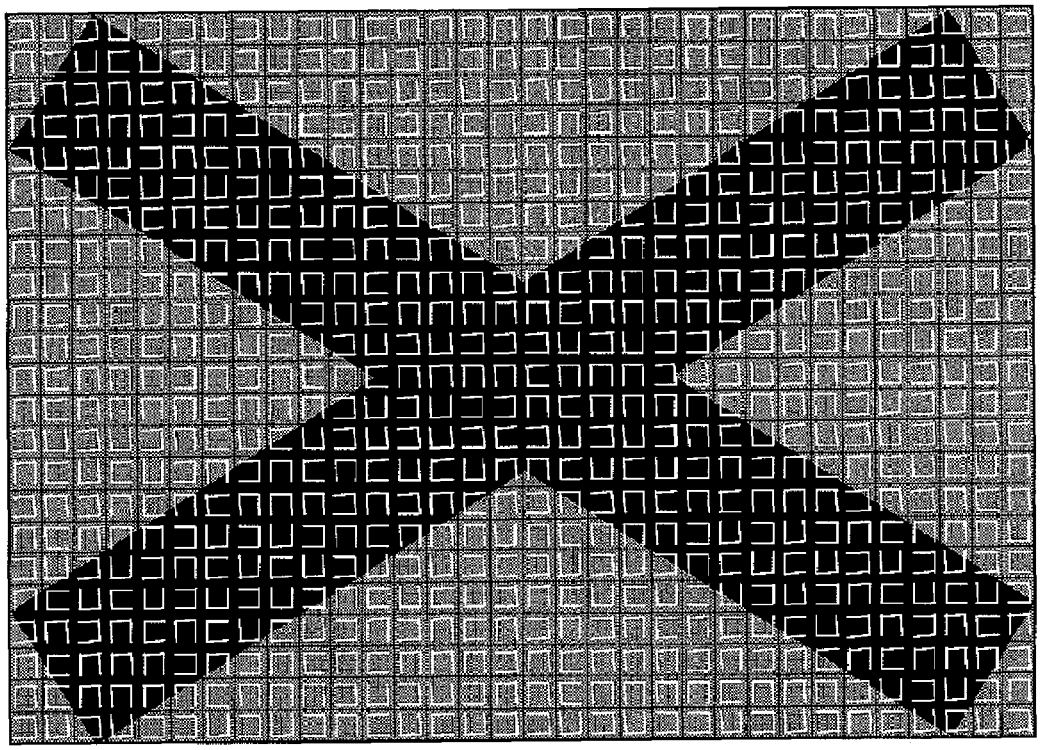
FIG. 11 is a diagram illustrating an example of a copy-forgery-inhibited pattern image to which a camouflage pattern image is applied, the camouflage pattern image is generated in accordance with an embodiment to which the present invention can be applied.

Next, an example of key information will be described with reference to FIG. 10. In FIG. 10, the large X-like shape represents a latent image and each element of the lattice represents a borderline of a bit representation pattern. A matrix representing the key information is shown while being superposed at the top. FIG. 11 shows a combination of bit representation patterns using the key information as described above. FIG. 11 shows an example in which a latent image part and a background part are synthesized with a camouflage pattern image. As described above, the respective elements have camouflage pattern images that are set to have 1 (one) or 0 (zero).

The random number generation section 603 is a section for generating a random number sequence for specifying individual bit representation patterns corresponding to elements of 0 (zero) in the matrix of the key information. This is used for determining values that are randomly allocated, in the above-described key information matrix, with bit representation patterns corresponding to elements of 0 (zero). Specifically, in Embodiment 1, to-be-extracted data is not added in a camouflage pattern image in a background region that disappears when copied and dummy data is added therein. Specifically, although a camouflage pattern image superposed on a background part in an output is seemingly the same as a camouflage pattern image superposed on a latent image part, information represented by the camouflage pattern image does not have any meaning.

The key information retention section 604 is a section that mainly retains key information generated by the generation section 602 based on latent image information. The key information may be retained in a program or may be outputted to another device (e.g., image reading apparatus).

The camouflage structuring section 605 structures an image-designating-region-of-camouflage-pattern-images by key information, redundant information, a random number sequence, and a bit representation pattern. The redundant information is added by a bit representation pattern corresponding to a part in which an element in a key information matrix is 1 (one). A random number sequence added by a bit representation pattern to a part having an element is 0 (zero). In this manner, an image-designating-region-of-camouflage-pattern-images is structured.

Then, this image-designating-region-of-camouflage-pattern-images is inputted to the above-described copy-forgery-inhibited pattern image generation section as the image-designating-region-of-camouflage-pattern-images of FIG. 2, thereby providing the generation of a copy-forgery-inhibited pattern image in which digital information is added.

The reason why information having the size corresponding to one page of a document is required is due to an assumption that an image-designating-region-of-camouflage-pattern-images to be outputted has a size that is equal to the one page of the document. By this assumption, a pattern representing a latent image region can have an arbitrary size.

As described above, the image-designating-region-of-camouflage-pattern-images outputted by the camouflage structuring section 605 here has a function for suppressing the human eye from differentiating the boundary between a latent image part and a background part. In addition to this function, the image-designating-region-of-camouflage-pattern-images also has another function for representing digital information and is composed of bit representation patterns as shown in FIG. 7 to FIG. 9.

The key information here is a matrix that is prepared by a processing as described below and the respective elements are information showing whether the respective bit representation patterns are all included in a latent image part or not. In this key information, an element of 1 (one) represents that the respective bit representation patterns are all included in a latent image part while an element of 0 (zero) represents that not all of the respective bit representation patterns are included in a latent image part.

As described above, the key information is represented as a matrix. For simple illustration, key information is represented as 000111010 for example. A bit string of a random number sequence is represented as $r_1, r_2, r_3, r_4, r_5, r_6, r_7, r_8$, and $r_9$ each of which is 2 bits. It is assumed that bit strings of arbitrary information are represented as a, b, c, and d each of which is 2 bits and the bit representation pattern is specified as shown in FIG. 8 for example. In this case, the key information can be used to finally generate the bit string of $r_1, r_2, r_3, r_4, r_5, r_6, r_7, r_8$, and $r_9$ and representation patterns corresponding to this bit string are sequentially arranged. In this case, a bit string represented as $r_1, r_2, r_3$, a, b, c, $r_4$, d, and $r_5$, also may be generated. In short, a bit string of arbitrary information is allocated only to a position where an element of key information is 1 (one).

Figure 12:
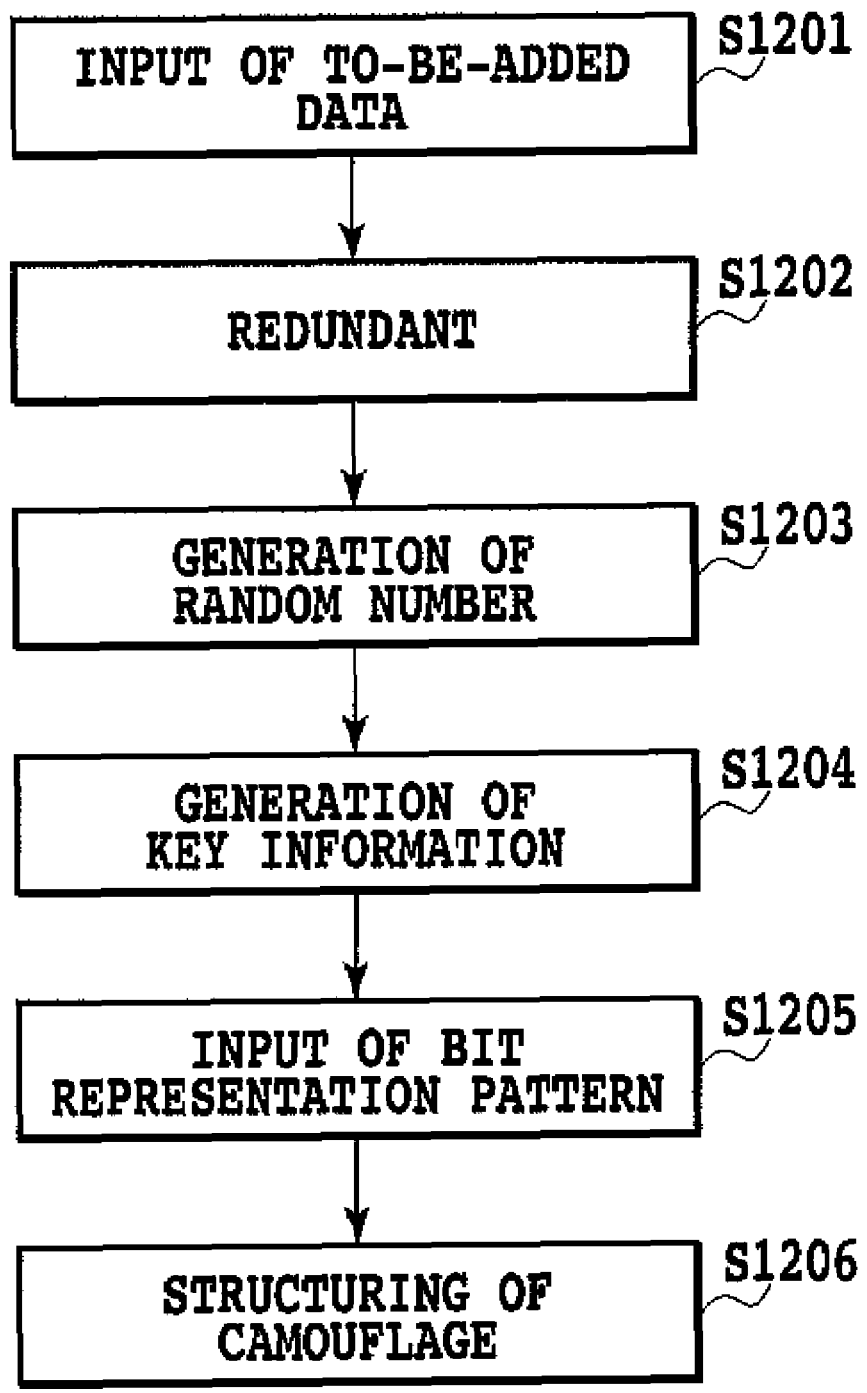
FIG. 12 is a flowchart illustrating the procedure of an image-designating-region-of-camouflage-pattern-images-generation processing of an embodiment to which the present invention can be applied.

Next, the above processing with reference to FIG. 6 to FIG. 11 will be described as a software-using processing performed by the CPU 111 with reference to the flow of FIG. 12.

First, S1201 inputs arbitrary information (data) to be added as a camouflage pattern image. This input is performed by a user for example via a user interface. This input also may be automatically performed by a copy-forgery-inhibited pattern image generation program or other programs for example. In this input, latent image information, document size information, a bit representation pattern (which will be described later) also may be inputted or selected for example. Then, the redundant section makes the data inputted by S1202 to be redundant. The purpose of this redundant operation is, in addition to the above, to make a bit representation pattern (which corresponds to an element 1 (one) of key information) based on arbitrary information (i.e., to-be-added digital information) to be random. Specifically, the purpose of this redundant operation is to prevent the surrounding bit representation patterns to be noticed as the ones representing specific data. For example, when two specific bit representation patterns are continued in series, then a representation pattern having an order next to these patterns may be provided.

Next, the random number generation section generates a random number sequence in S1203. Then, the key information generation section performs, in S1204, a processing for generating key information based on latent image information, document size information, and a bit representation pattern. Thereafter, S1205 inputs a plurality of bit representation patterns. The camouflage structuring section 605 outputs, in step S1206, an image-designating-region-of-camouflage-pattern-images based on the redundant information, random number sequence, key information, and bit representation patterns.

Embodiment 1 has described a system by which a camouflage pattern image is superposed in which arbitrary information is represented in a latent image part so that the information can be securely extracted from the copy. However, another system having an opposite purpose for preventing the extraction of the arbitrary information from a copy also can be provided by superposing the arbitrary information on a background part. In this case, the key information generation section 602 may specify whether an element is 0 (zero) or 1 (one) based on whether the background part includes a bit representation pattern or not.

In the above system, the key information generation section uses latent image information regardless of whether arbitrary information (i.e., to-be-added digital information) is added in a latent image part or a background part.

(Description of Reading of Original)

Next, an operation for reading an original will be described. When a copying machine described in the section of "DESCRIPTION OF THE RELATED ART" reads an original, the machine subjects the original to exposure and scanning to read the brightness data by a CCD (charge-coupled device). Then, the data is subjected to an A/D (analog-to-digital) conversion and is subsequently subjected to a series of predetermined image processings (e.g., shading, LOG conversion). These procedures will be described hereinafter.

Figure 14:
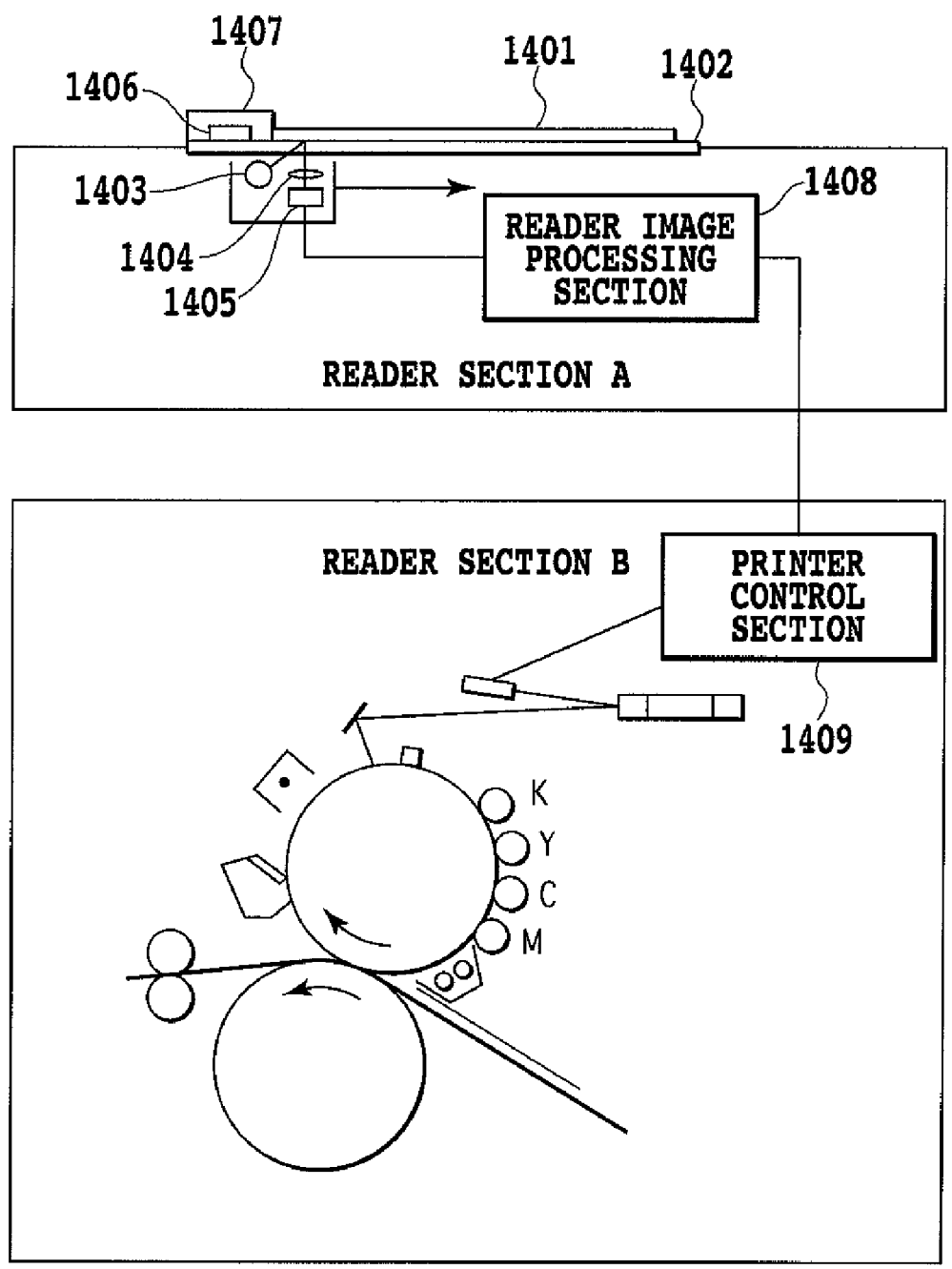
FIG. 14 is a diagram schematically illustrating a copying machine consisting of an image reading section and an image formation section of an embodiment to which the present invention can be applied.

FIG. 14 is a block diagram illustrating the structure of the copying machine of Embodiment 1. The copying machine of FIG. 14 is a full-color copying machine composed of a reader section A and a printer section B. The following section will describe only the reader section A.

An original 1401 placed on an original glass plate 1402 is illuminated by a light source 1403 and is imaged by a CCD sensor 1405 via an optical system 1404. The CCD sensor 1405 is composed of red, green, and blue CCD line sensor groups arranged in three rows so that each line sensor generates red, green, or blue color component signal. When the original 1401 is read by these reading optical system units in the direction shown by the arrow, the original 1401 is converted to electric signal data strings of the respective lines.

A stopper 1407 is provided on the original glass plate 1402 to which an original is abutted to prevent the original from being placed in a skewed manner. A reference white plate 1406 is also provided on the original glass plate surface of the original glass plate 1402 that determines a white level of the CCD sensor 1405 to perform shading in the thrust direction of the CCD sensor 1405. The image signal obtained by the CCD sensor 1405 is subjected to an image processing by a reader image processing section 1408 and is then sent to the printer section B and is subjected to an image processing by the printer control section 1409. Next, the reader image processing section 1408 will be described.

Figure 15:
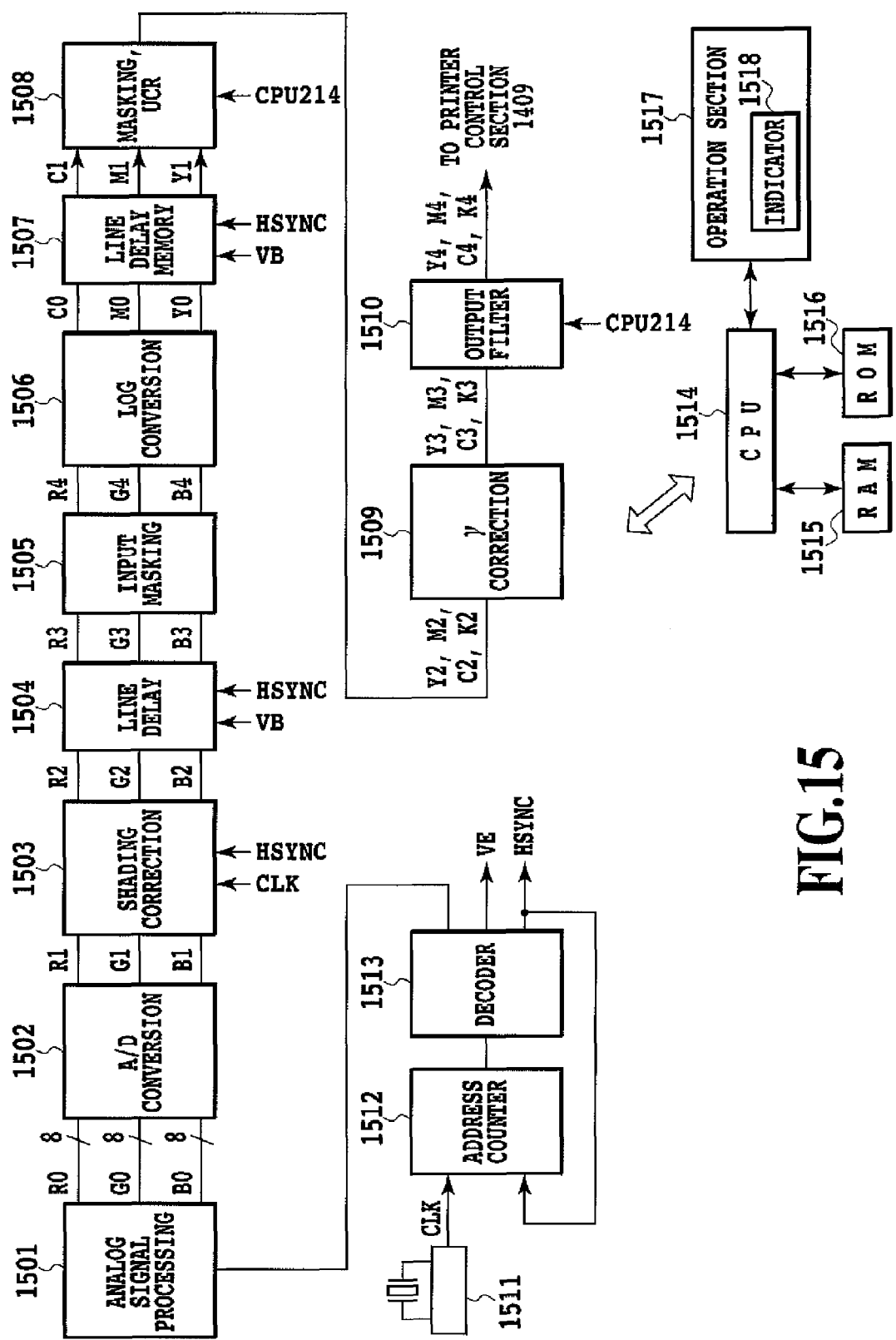
FIG. 15 is a diagram illustrating the flow of a data processing and function blocks in the image reading section of an embodiment to which the present invention can be applied.

FIG. 15 is a block diagram illustrating the flow of the processing of an image signal by the reader image processing section 1408. The image signal outputted from the CCD sensor 1405 is inputted to an analog signal processing section 1501 and is subjected to gain adjustment and offset adjustment and is subsequently converted, by an A/D conversion section 1502, to 8-bit digital image signals R1, G1, and B1 for the respective color signals. Next, the 8-bit digital image signals R1, G1, and B1 are inputted to a shading correction section 1503 and are subjected to a known shading correction using the reading signals by the reference white plate 1406 for the respective colors.

A clock generation section 1511 generates a clock for one pixel. A main scanning address counter 1512 counts the number of clocks from the clock generation section 1511 to generate a pixel address output for one line. A decoder 1513 decodes the main scanning address from the main scanning address counter 1512. The decoder 1513 generates a CCD driving signal for a line (e.g., shift pulse, reset pulse). The decoder 1513 also generates a VE (vertical synchronization signal end) signal that represents an effective region in the reading signal for one line from the CCD and a horizontal synchronizing signal (HSYNC). The main scanning address counter 1512 is cleared by the HSYNC signal and starts counting main scanning addresses of the next line.

The respective line sensors of the CCD sensor 1405 are arranged to have a predetermined distance thereamong. Thus, the line display circuit 1504 corrects a spacial displacement in the sub-scanning direction. Specifically, matching with the B signal is obtained by a line delay to the B signal in the sub-scanning direction and a line delay to the respective R and G signals in the sub-scanning direction.

An input masking section 1505 is a section that converts a read color space determined by spectroscopic characteristics of R, G, and B filters of a CCD sensor to a standard color space according to NTSC (National Television System Committee). This performs a matrix calculation as shown by the following formula.

$$\begin{pmatrix} R4 \\ G4 \\ B4 \end{pmatrix} = \begin{pmatrix} a11 & a12 & a13 \\ a21 & a22 & a23 \\ a31 & a32 & a33 \end{pmatrix} \begin{pmatrix} R3 \\ G3 \\ B3 \end{pmatrix} \quad (1)$$

where a11 to a33 represent conversion coefficients for converting a color space.

A light intensity/density conversion section (LOG conversion section) 1506 is composed of a lookup table ROM and converts R4, G4, and B4 brightness signals to C0, M0, and Y0 density signals. A line delay memory 1507 delays C0, M0, and Y0 image signals by a line delay to a determination signal (e.g., UCR, FILTER) or the like that is generated by a black character determination section (not shown) based on R4, G4, and B4 signals.

A masking and UCR circuit 1508 extracts a black signal (K) from the inputted three primary color signals of Y1, M1, and C1. Furthermore, the UCR circuit 1508 performs a calculation for correcting the color turbidity of the recording color material in the printer section B to sequentially output Y2, M2, C2, and K2 signals with a predetermined bit width (8 bits) for every reading operation. A γ correction circuit 1509 performs density correction so that the reader section A can have an ideal tone characteristic for the printer section B. A space filter processing section (output filter) 1510 performs an edge reinforcement or a smoothing processing. The M4, C4, Y4, and K4 frame sequential image signals thus processed are sent to the printer control section 1409 and the printer section B records the density by PWM (pulse width modulation).

The reader image processing section 1408 also includes a CPU 1514 for controlling the reader section A, a RAM 1515, a ROM 1516, and an operation section 1517 having an indicator 1518. The above-described flow of the processings of the image signal is executed by the CPU 1514. The CPU 1514 uses a program and data stored in the RAM 1515 and the ROM 1516 to control the entirety of the reader section A and to perform processings (which will be described later). The ROM 1516 stores therein various pieces of information for causing the CPU 1514 to perform the respective processings (e.g., a reading program which will be described later).

Figure 16:
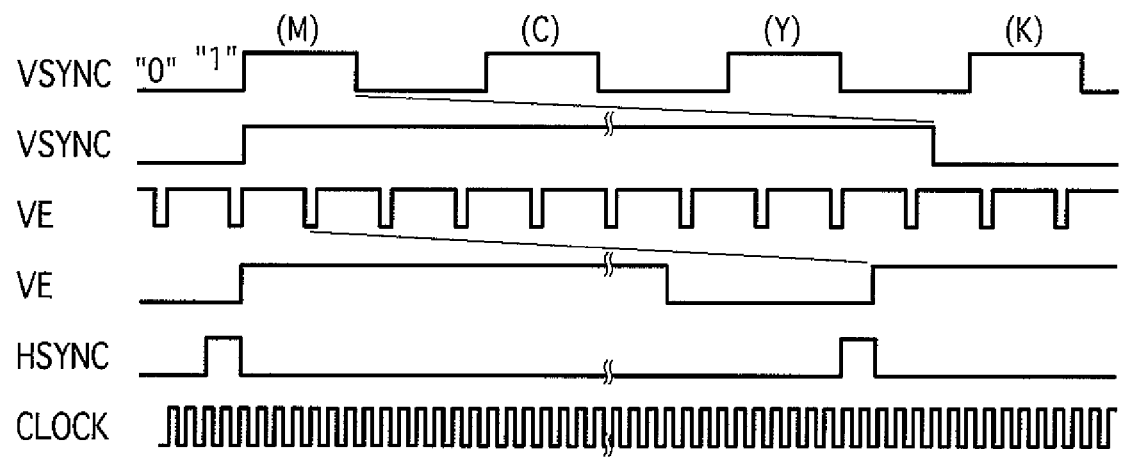
FIG. 16 is a diagram illustrating a signal processing in image formation of an embodiment to which the present invention can be applied.

FIG. 16 is a timing chart illustrating control signals in the reader image processing section. A VSYNC signal is an image effective zone signal in the sub-scanning direction in which an image reading (scanning) is performed in a logic "1" zone to sequentially form (C), (M), (Y), and (K) output signals. A VE signal is an image effective zone signal in the main scanning direction that generates, in the logic "1" zone, a timing for a main scanning starting position and that is mainly used for controlling the line count in the line delay. A CLOCK signal is a pixel synchronization signal that is used for transferring image data with a timing at which "0" is risen to "1".

Next, a case will be described where an original including a copy-forgery-inhibited pattern image is read by the above-described reader section. In this case, high-frequency components that can be reproduced are limited depending on the CCD density. Thus, it is assumed that high-frequency components having a level equal to or higher than a certain level cannot be reproduced. Specifically, a background part of a copy-forgery-inhibited pattern image on a read original composed of minute points disappears when being copied, causing only the latent image part to remain on the copy. Thus, it can be said that the reader section causes the latent image part appearing in the copy.

Hereinafter, a processing for reading a two dimensional-coded camouflage pattern image, which is a characteristic of the present invention, will be described. This processing is composed of two processings. One processing is the one that can also extract a copy-forgery-inhibited pattern image from a copy (Embodiment 1). The other processing is the one that can extract a copy-forgery-inhibited pattern image only from an original (Embodiment 2).

Hereinafter, the processing according to Embodiment 1 that can also extract a copy-forgery-inhibited pattern image from a copy will be described. The following section will describe a processing for scanning a printed matter obtained by synthesizing an image of the contents with a copy-forgery-inhibited pattern image including a two-dimensional camouflage pattern image prepared as described above by the adding processing described with reference to FIGS. 1 to 12.

This processing is performed by a digital information extraction apparatus (e.g., the reader image processing section 1408), which will be describe below. First, the functional structure of the digital information extraction apparatus will be described with reference to FIG. 17.

Figure 17:
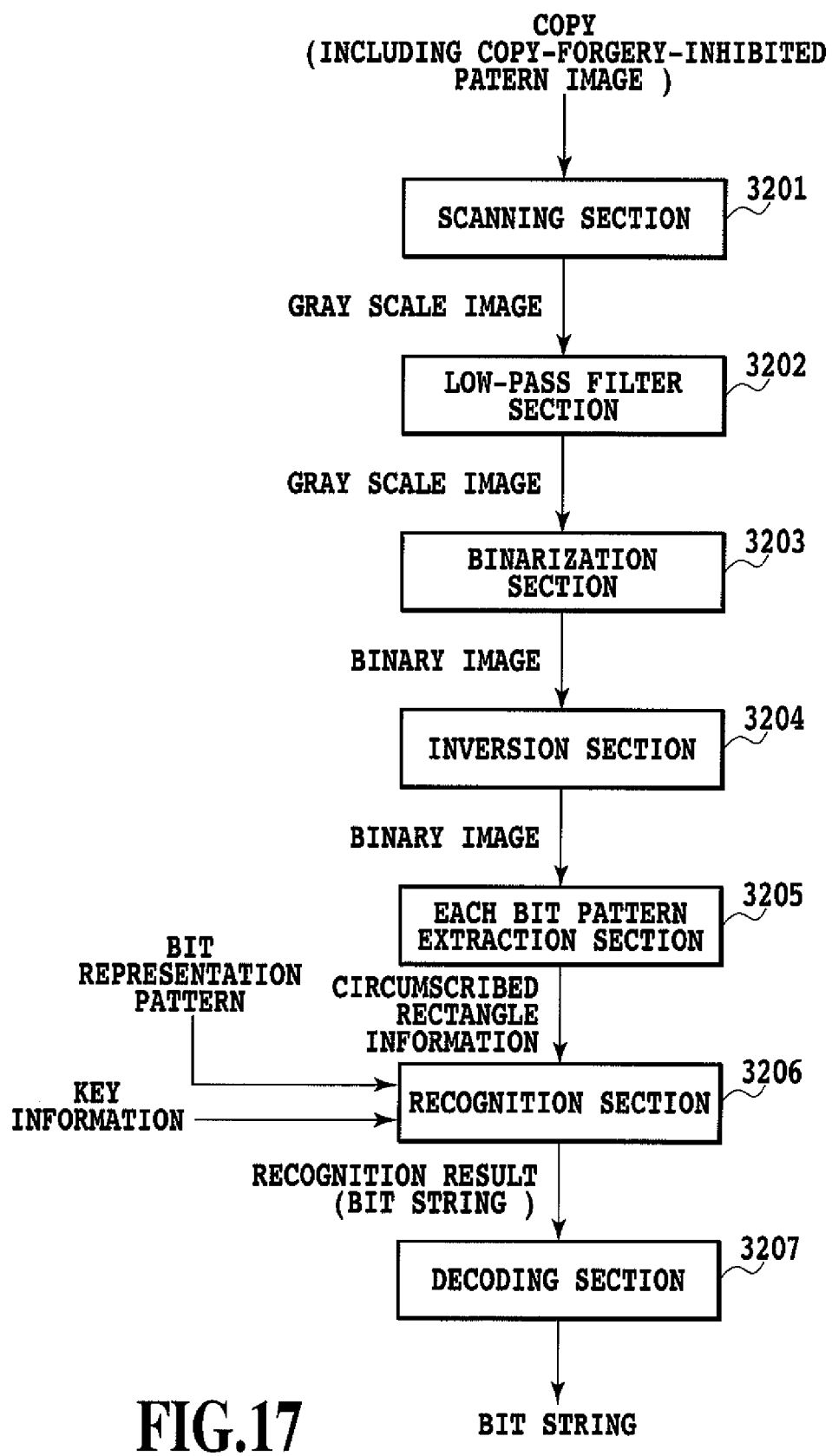
FIG. 17 is a diagram illustrating the flow of a camouflage pattern image recognition processing and function blocks according to Embodiment 1 of the present invention.

As shown in FIG. 17, the digital information extraction apparatus is composed of: a canning section; a low-pass filter section; a binarization section; an inversion section; an each bit pattern extraction section; a recognition section; and a decoding section. Although this structure will be described as software provided as a part of a reading program, this structure also can be configured as a hardware.

The scanning section 3201 reads a to-be-printed document having a copy-forgery-inhibited pattern image representing digital information in the background to convert the document to a gray scale image data. Here, the gray scale electronic image data is composed of pixels each of which has 256 tones.

The low-pass filter section 3202 subjects the electronic image data inputted to the scanning section 3201 to an appropriate low-pass filtering. This provides the smoothing of spaces among large dots and dots of the copy-forgery-inhibited pattern image, thus enhancing the camouflage pattern image.

Figure 18:
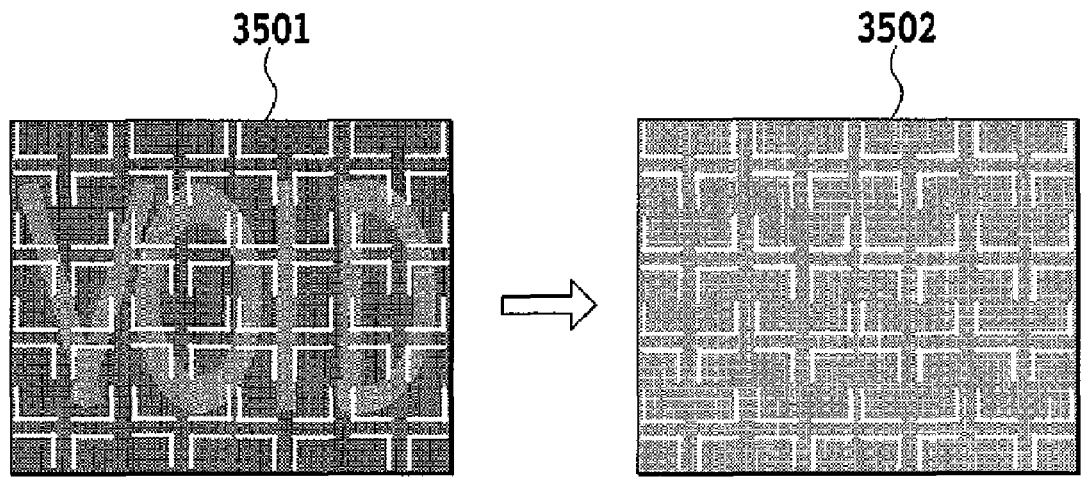
FIG. 18 is a concept diagram of an image when the image data is subjected to a filter processing in an embodiment to which the present invention can be applied.

FIG. 18 illustrates a case where an image including a copy-forgery-inhibited pattern image is subjected to a low-pass filtering. In FIG. 18, a copy-forgery-inhibited pattern image 3501 shown at the left includes a character string of "VOID" as a latent image and an image 3502 at the right is obtained by subjecting the copy-forgery-inhibited pattern image to a low-pass filtering.

The binarization section 3203 binarizes the image subjected to the low-pass filter. The binarization here is an operation for substituting, based on a predetermined appropriate threshold value, a value equal to or higher than the threshold value with 1 (one) and a value smaller than the threshold value with 0 (zero). Here, 1 (one) represents black and 0 (zero) represents white.

Figure 19:
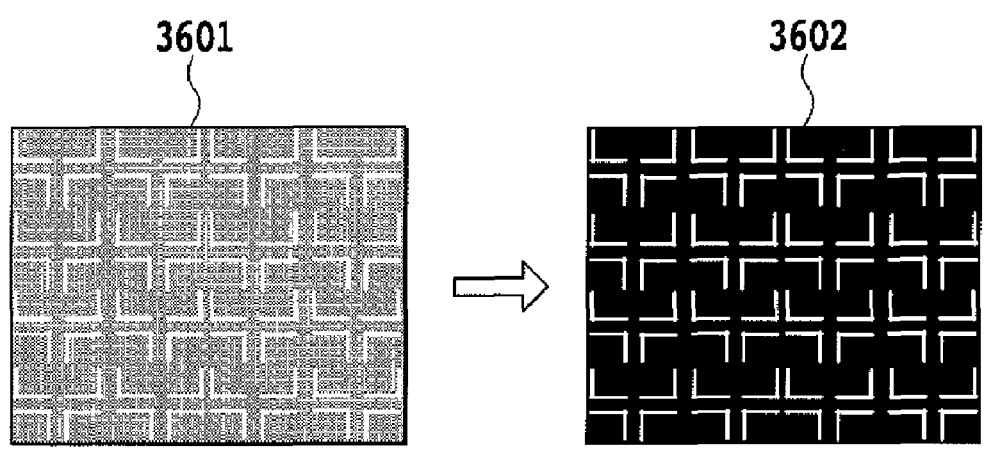
FIG. 19 is a concept diagram of an image when the image data is subjected to a binarization processing in an embodiment to which the present invention can be applied.

FIG. 19 shows an example of this binarization. In FIG. 19, the left part shows an image 3601 before the binarization and the right part shows an image 3602 after the binarization.

Figure 20:
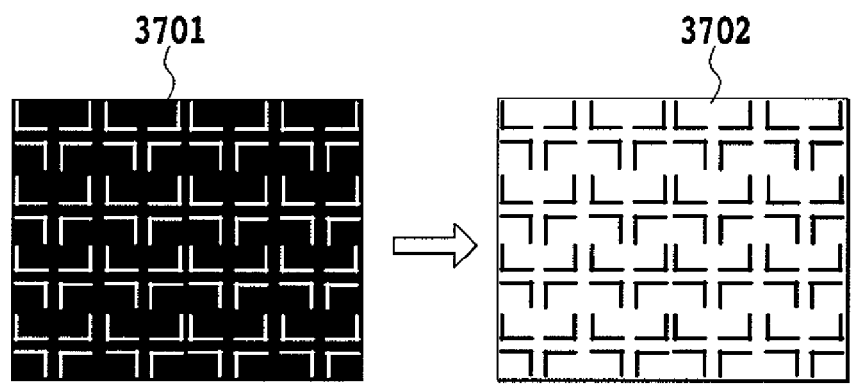
FIG. 20 is a concept diagram of an image when the image data is subjected to an inversion processing in an embodiment to which the present invention can be applied.

The inversion section 3204 inverts the respective pixel values binarized by the binarization section. Specifically, a pixel value of 0 (zero) is changed to 1 (one) and a pixel value of 1 (one) is changed to 0 (zero). FIG. 20 shows examples before and after the inversion. In FIG. 20, the reference numeral 3701 denotes an image before the inversion and the reference numeral 3702 denotes an image after the inversion.

The above-described operation by the respective sections is a preprocessing for the recognition and is performed in order to find bit representation patterns constituting a camouflage pattern image. Here, a foreground of a document (e.g., character, frame border of table) that shows a high density when being scanned is expected to be 0 (zero) by the binarization and inversion operations.

The each bit representation pattern extraction section 3205 extracts connected components to extract bit representation patterns constituting the camouflage pattern image. The extraction of connected components is a known technique to those skilled in the art that is used for dividing a document image to a text region and a graphic region. The bit representation patterns are extracted by taking projections in the vertical direction and the horizontal direction to detect a cycle of a part having a low density.

Figure 23:
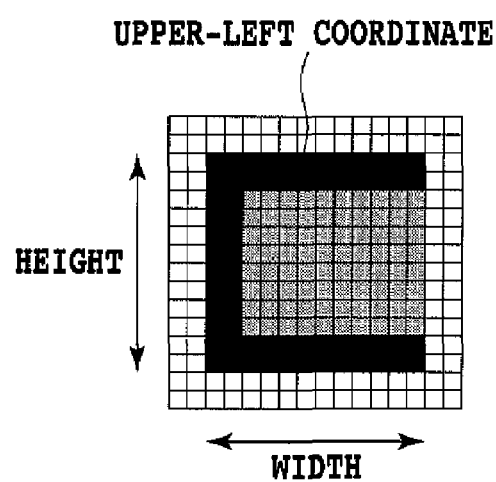
FIG. 23 is a diagram illustrating a region for extracting region information of a bit representation pattern in an embodiment to which the present invention can be applied.

Specifically, the each bit representation pattern extraction section 3205 extracts region information of the respective bit representation patterns. The region information is a rectangle circumscribed with the respective bit representation patterns. The rectangular region can be represented by a combination of information of upper-left coordinates and information of height and width of the region as shown in FIG. 23.

The recognition section 3206 recognizes, based on the region information of the respective extracted bit representation patterns, the information represented by the respective bit representation patterns. Then, the recognition section 3206 extracts digital information (the above-described arbitrary information) represented in the scanned document to be printed as a bit string in which the respective elements are 0 (zero) or 1 (one). This recognition is performed by referring to the key information generated by the adding processing of FIGS. 1 to 12 to recognize only bit representation patterns corresponding to the latent image part.

The recognition section 3206 does not perform any processing based on the assumption that a bit representation pattern corresponding to a background part includes a value irrelevant to the extraction (e.g., random value).

Here, a fixed point sampling method is used as a pattern matching method. The fixed point sampling method is a method as shown in FIG. 22 that determines a pattern by detecting whether fixed positions in the pattern (shown by the circles in FIG. 22) includes dots or not.

Figure 22:
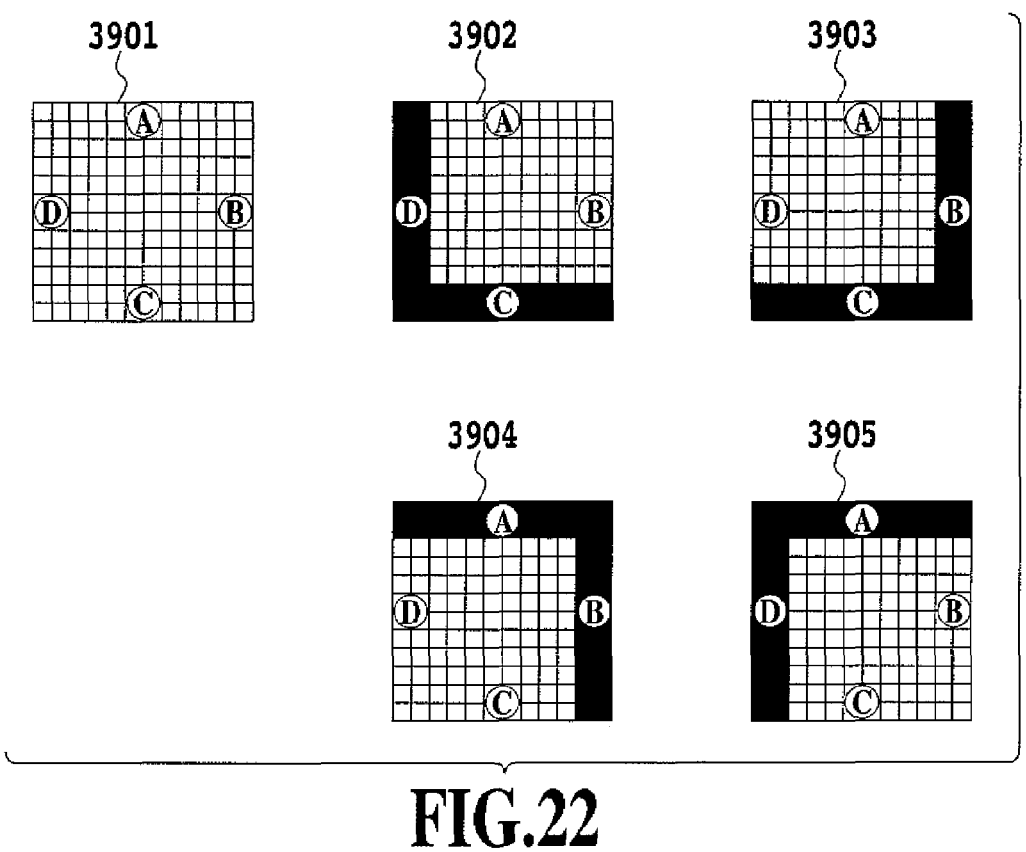
FIG. 22 is a diagram illustrating a pattern matching processing to image data in an embodiment to which the present invention can be applied.

With reference to FIG. 22, a method for the matching of the bit representation patterns will be described. This method checks four positions in a pattern to determine what is represented by this pattern. The four positions are those shown in FIG. 22 represented by A, B, C, and D in the reference numerals 3901 to 3905.

The method as described above can provide pattern matchings as shown below.

When A: white, B: white, C: black, and D: black are established, 00 is represented (see 3902).
When A: white, B: black, C: black, and D: white are established, 01 is represented (see 3903).
When A: black, B: white, C: white, and D: black are established, 10 is represented (see 3904).
When A: black, B: black, C: white, and D: white are established, 11 is represented (see 3905).

This fixed point sampling method has been conventionally known as one of color character recognition techniques. For example, such a technique is disclosed in "Moji Ninshiki Gairon" (written by Shinichiro Hashimoto, The Telecomminications Association, P 66). However, pattern matching methods other than this fixed point sampling method also may be used.

Figure 21:
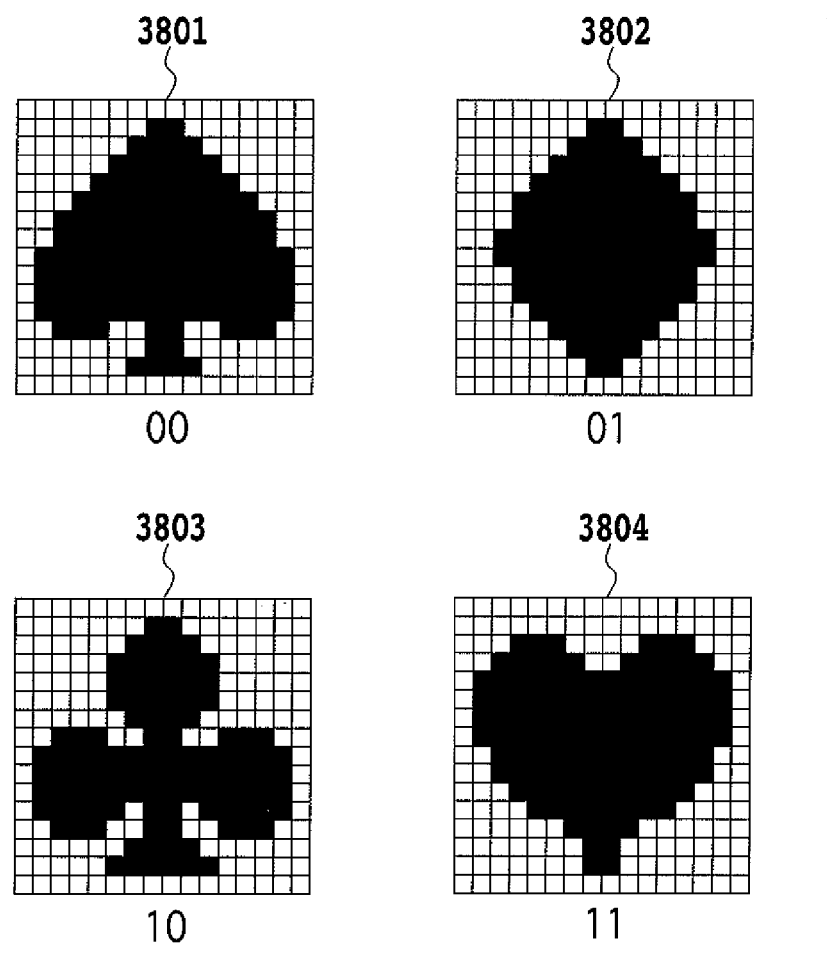
FIG. 21 is a diagram illustrating an example of a pattern that can be used in the present invention.

For example, another well-known pattern matching method using a matched filter or Fourier phase correlation method also may be used. For example, such a technique is disclosed in "Kagaku Keisoku no tameno Gazou Data Shori" (written and edited by Satoshi Kawada/Shigeo Minami, CQ Publishing). In this case, an arbitrary pattern (e.g., heart, spade, club, diamond of a playing card as shown in FIG. 21) can be used.

Then, an error correction decoding section 3207 subjects the above determined bit string to an error correction decoding. The operation as described above can extract the added digital information from the latent image part in the copy-forgery-inhibited pattern image in the printed document.

By the processing as described above, the digital information extraction apparatus extracts the digital information represented by the camouflage pattern image.

By combining the above-described on-demand pattern printing system with a copying machine, a printed matter is prepared that is obtained by synthesizing a copy-forgery-inhibited pattern image including a camouflage pattern image with an image of the contents. A system can be structured that reads an encoded camouflage pattern image from the printed matter.

Embodiment 2

Embodiment 1 has described a processing for extracting, from a copied paper (i.e., a paper in which a background image disappears or has a reduced density and a latent image appears), arbitrary information represented as a camouflage pattern image of a copy-forgery-inhibited pattern image. This is realized when only a latent image part has latent image information as one of pieces of key information and includes added information. The reason is that the latent image part is also reproduced in a copy and thus a camouflage pattern image drawn to be superposed on the latent image part also can be recognized in the copy. Embodiment 1 also has described a case where a background part included added information.

Specifically, Embodiment 1 was based on the assumption that information is extracted from a copy and has described a processing for adding digital information into a camouflage pattern image that exists in a latent image part and that is reproduced in a copy, and the extraction method thereof. This method also can, of course, information from an output before the copying operation (i.e., a printout obtained by synthesizing a copy-forgery-inhibited pattern image with an image of contents (which will be called as original hereinafter).

Hereinafter, Embodiment 2 will describe a processing for reading a two-dimensional-coded camouflage pattern image when the pattern can be extracted only from an original.

Figure 13:
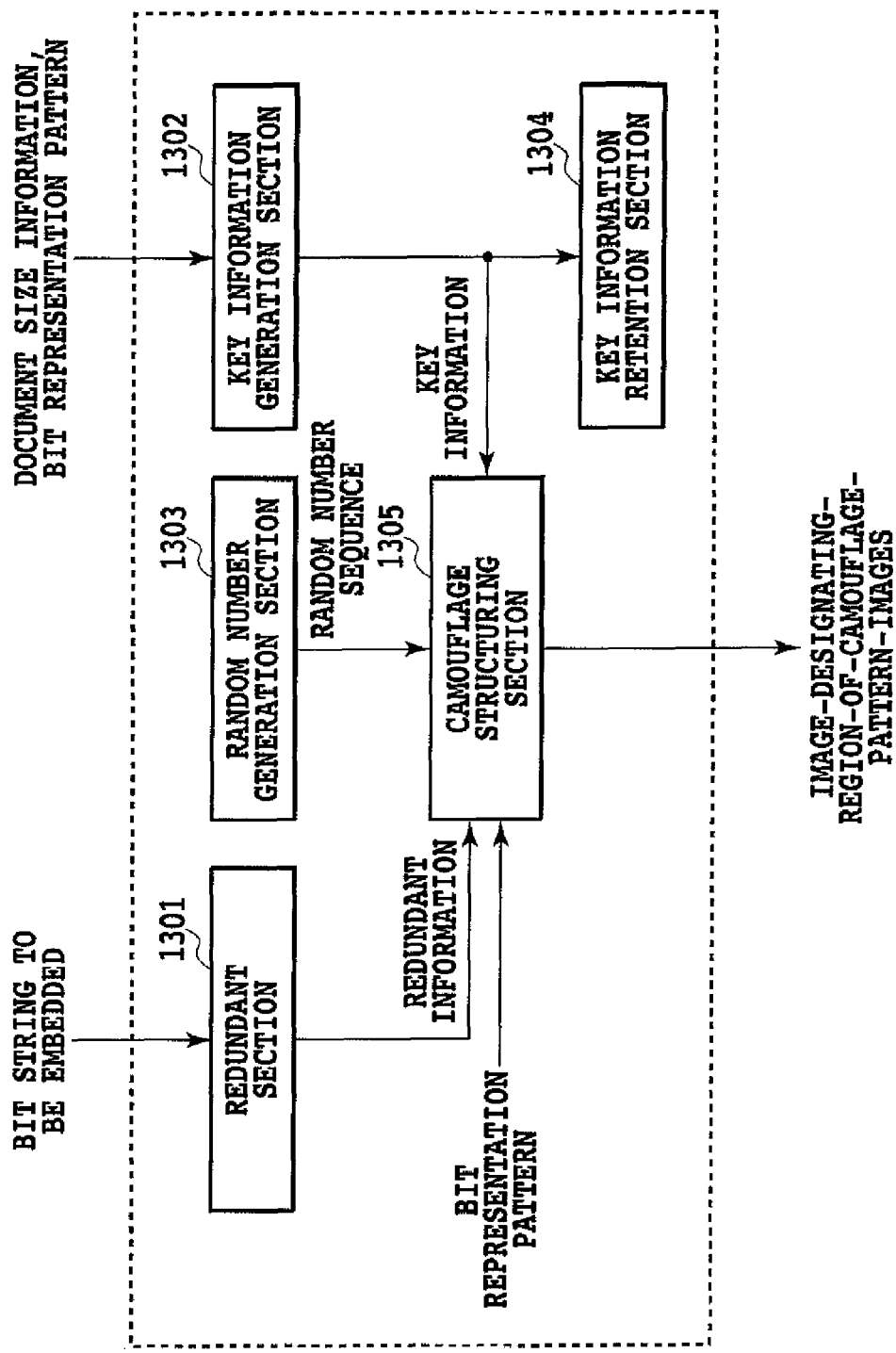
FIG. 13 is a block diagram illustrating the structure of an image-designating-region-of-camouflage-pattern-images-generation section of an embodiment to which the present invention can be applied.

In contrast with Embodiment 1 as described above, Embodiment 2 will describe a system intended to extract arbitrary information only from a forgery prevention copy-forgery-inhibited pattern image of an original (i.e., normal output). Embodiment 2 is almost the same as Embodiment 1 for the structure for providing information of a camouflage pattern image but is different from Embodiment 1 in that Embodiment 1 requires latent image information in order to generate key information while Embodiment 2 does not require latent image information in order to generate key information. In other words, Embodiment 2 intends to handle an image not including a latent image part and an image in which a latent image part and a background part can be similarly handled without requiring differentiation. This structure is shown in FIG. 13. Embodiment 2 is basically the same as Embodiment 1 with regards to the generation procedure and the details of the processings by the respective processing sections.

Considering that arbitrary information is extracted only from a normal output obtained by synthesizing a copy-forgery-inhibited pattern image with an image of contents (i.e., original), the information can be represented not only in a latent image part but also in a camouflage pattern image superposed on a background part.

The structure shown in FIG. 13 is different from the one shown in FIG. 6 in a key information generation section 1302. It is noted that, although not shown, information for determining whether an element in a matrix of key information should be 0 (zero) or 1 (one) is required. Embodiment 1 has performed this based on latent image information. Embodiment 2 also can assume an area within a predetermined region as an element 1 or also can detect a blank region in an input image of an original shown in FIG. 2 to assume the entirety or a part of the region as an element 1. When an element 1 is assumed as corresponding to a blank region of an input image of an original in particular, a camouflage pattern image not including characters, graph, or marks or the like of the input image of an original will be read regardless of the type or size of the camouflage pattern image. Thus, the resultant data can be accurate data. It is also possible, of course, to consider even the size or the like of a camouflage pattern image overwritten with characters, graph, marks, or the like of an input image of an original (e.g., use of line spacing). This can prevent the detection of a camouflage pattern image from having an influence by the size or positions of characters that are overwritten on the pattern.

With regards to the acquisition of data added as a camouflage pattern image, the respective generations of key information are summarized as shown below.
1) Only a latent image part is used as an element 1.: The data can be obtained based on an original and the copy thereof. However, this case is influenced by an input image of the original printed thereon.
2) Only a background part is used as an element 1.: The data can be obtained based on an original only. However, this case is influenced by an input image of the original printed thereon.
3) The entirety or a part of a blank region of an input image of an original is used as an element 1 without using latent image information.: The data can be obtained based on the original only. This case is not influenced by the input image of the original printed thereon. When the blank region is small, data that can be added is reduced.

Embodiment 2 is used only when the extraction of information from a copy is not considered. Specifically, Embodiment 2 extracts information only from a printout in which a copy-forgery-inhibited pattern image is synthesized with an image of contents (original).

When the structure of Embodiment 2 is compared with that of Embodiment 1, an advantage is provided in that information can be represented not only in a latent image part but also in a camouflage pattern image of a background part and a larger amount of information can be thus added in a case of a structure in which the information is added only in a camouflage pattern image of a latent image part.

With regards to the generation of a copy-forgery-inhibited pattern image as described above, Embodiment 2 is the same as Embodiment 1 except for that a camouflage pattern image is generated without having the above-described latent image information (i.e., key information of the latent image).

Embodiment 2 also has the same processing as that of Embodiment 1 except for that a generated copy-forgery-inhibited pattern image is read by extracting the information without using the key information of the latent image. Since the key information of the latent image is not used, the recognition section 3206 of FIG. 17 recognizes camouflage pattern images both of a background part and a latent image part.

By combining the above-described on-demand pattern printing system with a copying machine, a printed matter is prepared in which a copy-forgery-inhibited pattern image including a camouflage pattern image is synthesized with an image of contents. Thus, a system can be established that reads a coded camouflage pattern image from the printed matter.

Other Embodiments

It is noted that Embodiment 1 and Embodiment 2 as described above may be used in a system composed of plurality of machines (e.g., host computer, interface device, reader, printer) or may be used in an apparatus consisting of one machine (e.g., copying machine, facsimile apparatus).

The objective of the present invention is also achieved by supplying, to a system or an apparatus, a recording medium (or a storage medium) realizing the above-described function of the embodiments so that a computer (or CPU or MPU) of the system or the apparatus reads and executes a program code stored in the recording medium. In this case, the program code read from the recording medium realizes the above-described function of the embodiments and thus the recording medium in which the program code is recorded constitutes the embodiment. Furthermore, the present invention is not limited to a case where the program code read by the computer is executed to realize the above-described function of the embodiments. The present invention also includes a case where an OS or the like running on the computer performs, based on the instruction by the program code, the entirety or a part of an actual processing to realize the function of the above-described embodiments.

Furthermore, the present invention also includes the followings case. A program code read from a recording medium is written to a function enhancement card inserted to the computer or a memory included in a function enhancement unit connected to the computer. Thereafter, based on the instruction by the program code, the entirety of a part of an actual processing is performed by the CPU or the like included in the function enhancement card or the function enhancement unit.

When the embodiments are applied to the above recording medium, the recording medium will store therein the above-described flowcharts and program codes corresponding to the functional system.

Any of the above-described embodiments is a mere example of an embodiment for carrying out the present invention and should not be interpreted as limiting the technical scope of the present invention. Specifically, the present invention can be carried out in various forms without deviating from the technical concept and the main characteristics.

The present invention has been described in detail with respect to preferred embodiments, and it will now be apparent from the foregoing to those skilled in the art that changes and modifications may be made without departing from the intention in its broader aspect, and it is the intention, therefore, in the apparent claims to cover all such changes.

This application claims priority from Japanese Patent Application Nos. 2005-154618 filed May 26, 2005 and 2005-155700 filed May 27, 2005, which are hereby incorporated by reference herein.

What is claimed is:

1. An image processing apparatus comprising:
producing means for producing a copy-forgery-inhibited pattern image with a white pattern by arranging a plurality of types of white patterns based on a bit sequence, each white pattern included in the white patterns representing information in accordance with a shape, wherein the shape of each white pattern is such that the information represented by the white pattern can be detected using a fixed point sampling method; and
synthesizing means for synthesizing, with an input image, the copy-forgery-inhibited pattern image with the white pattern produced by the producing means, wherein
the white pattern is a pattern for making an outline of a latent image included in the copy-forgery-inhibited pattern image inconspicuous,
the producing means forms each white pattern included in the plurality of white patterns into such a shape as to be based on at least one bit corresponding to the white pattern in the bit sequence;
the white pattern is arranged in a specified region based on the bit sequence,
the specified region is a bigger dot region on the copy-forgery-inhibited pattern image;
the producing means arranges the plurality of types of white patterns in the bigger dot region based on the bit sequence; and
the producing means further arranges the plurality of types of white patterns in a smaller dot region on the copy-forgery-inhibited pattern image.

2. An image processing apparatus according to claim 1, wherein the producing means arranges the plurality of types of white patterns in the smaller dot region based on generated random numbers.

3. An image processing apparatus according to claim 1, wherein the producing means comprises:
image-designating-region-of-camouflage-pattern-images producing means for producing an image-designating-region-of-camouflage-pattern-images by arranging, on the specified region, the plurality of types of white patterns representing the information in accordance with the shape, based on the bit sequence; and
copy-forgery-inhibited pattern producing means for producing a copy-forgery-inhibited pattern image with a white pattern based on the image-designating-region-of-camouflage-pattern-images produced by the image-designating-region-of-camouflage-pattern-images producing means, a binary pattern for the bigger dot region and a binary pattern for the smaller dot region.

4. An image processing apparatus according to claim 1, further comprising input means for inputting arbitrary information, wherein the bit sequence is information produced by causing the information inputted by the input means to be redundant.

5. A control method for an image processing apparatus comprising the steps of:
producing a copy-forgery-inhibited pattern image with a white pattern by arranging a plurality of types of white patterns representing information in accordance with a shape, based on a bit sequence, wherein the shape of each white pattern is such that the information represented by the white pattern can be detected using a fixed point sampling method; and
synthesizing, with an input image, the copy-forgery-inhibited pattern image with the white pattern produced by the producing means, wherein
the white pattern is a pattern for making an outline of a latent image included in the copy-forgery-inhibited pattern image inconspicuous,
in the producing step, each white pattern included in a plurality of white patterns is formed into such a shape as to be based on at least one bit corresponding to the white pattern in the bit sequence;
the white pattern is arranged in a specified region based on the bit sequence,
the specified region is a bigger dot region on the copy-forgery-inhibited pattern image;
in the producing step, the plurality of types of white patterns are arranged in the bigger dot region based on the bit sequence; and
in the producing step, the plurality of types of white patterns are further arranged in a smaller dot region on the copy-forgery-inhibited pattern image.

6. A control method for an image processing apparatus according to claim 5, wherein in the producing step, the plurality of types of white patterns are arranged in the smaller dot region based on generated random numbers.

7. A control method for an image processing apparatus according to claim 5, wherein the producing step comprises the steps of:
producing an image-designating-region-of-camouflage-pattern-images by arranging, on the specified region, the plurality of types of white patterns representing information in accordance with the shape, based on the bit sequence; and producing the copy-forgery-inhibited pattern image with a white pattern based on the image-designating-region-of-camouflage-pattern-images produced by image-designating-region-of-camouflage-pattern-images producing step, a binary pattern for the bigger dot region and a binary pattern for the smaller dot region.

8. A control method for an image processing apparatus according to claim 5, further comprising the step of inputting arbitrary information, wherein the bit sequence is information produced by causing the information inputted in the input step to be redundant.

9. A computer program embodied in a computer-readable medium for causing a computer to perform the control method according to claim 5.

* * * * *